United States Patent
Hirai

(10) Patent No.: US 7,796,490 B2
(45) Date of Patent: Sep. 14, 2010

(54) OPTICAL PICKUP AND OPTICAL INFORMATION PROCESSING APPARATUS

(75) Inventor: Hideaki Hirai, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 55 days.

(21) Appl. No.: 12/244,162

(22) Filed: Oct. 2, 2008

(65) Prior Publication Data

US 2009/0040908 A1 Feb. 12, 2009

Related U.S. Application Data

(63) Continuation of application No. 11/138,519, filed on May 27, 2005, now Pat. No. 7,450,486.

(30) Foreign Application Priority Data

May 28, 2004 (JP) ............................. 2004-159641

(51) Int. Cl.
*G11B 7/00* (2006.01)
(52) U.S. Cl. .............................. 369/112.01; 369/112.03
(58) Field of Classification Search ............... 369/112.1, 369/112.01, 112.02, 112.23, 44.23, 44.24, 369/112.17, 112.03, 112.22
See application file for complete search history.

(56) References Cited

U.S. PATENT DOCUMENTS

| 5,703,856 | A | 12/1997 | Hayashi et al. |
| 6,185,176 | B1 | 2/2001 | Sugiura et al. |
| 6,545,958 | B1 | 4/2003 | Hirai et al. |
| 7,142,497 | B2 | 11/2006 | Hirai |
| 7,161,890 | B2 | 1/2007 | Komma et al. |
| 7,200,079 | B2 | 4/2007 | Ikenaka et al. |
| 7,233,562 | B2 | 6/2007 | Itonaga |
| 7,304,935 | B2 | 12/2007 | Ikenaka et al. |
| 7,327,663 | B2 | 2/2008 | Kimura et al. |
| 7,466,642 | B2 | 12/2008 | Sano et al. |
| 2002/0191502 | A1 | 12/2002 | Hirai |
| 2003/0067686 | A1 | 4/2003 | Shiono et al. |
| 2003/0072247 | A1 | 4/2003 | Hirai |
| 2003/0185133 | A1 | 10/2003 | Kaiho et al. |
| 2003/0227859 | A1 | 12/2003 | Hirai |

FOREIGN PATENT DOCUMENTS

| JP | 10-320814 | 12/1998 |
| JP | 3240846 | 10/2001 |
| JP | 2003-177226 | 6/2003 |
| JP | 2003-294926 | 10/2003 |
| JP | 2005-196930 | 7/2005 |
| WO | WO 03/091764 A1 | 11/2003 |

*Primary Examiner*—Nabil Z Hindi
(74) *Attorney, Agent, or Firm*—Dickstein Shapiro LLP

(57) ABSTRACT

An optical pickup performing recording, reproduction and deletion of information on or from an optical recording medium. The pickup includes light sources for information recording media using a blue wavelength beam, information recording media of DVD family and information recording media of CD family. A single object lens may be used to condense light from any of the light sources. A single aberration correction device may be disposed in a common light path between each of the light sources and the object lens.

12 Claims, 31 Drawing Sheets

FIG. 9

| SURFACE | RDY | THI | n |
|---|---|---|---|
| OBJ | INFINITY | INFINITY/149.5/INFINITY | |
| S1 | INFINITY | 0.50 | 1.53/1.51/1.51 |
| | C1 : 1.0416 × 10^(−3)<br>C4 : −7.8546 × 10^(−6) | C2 : −3.6796 × 10^(−4)<br>C5 : 2.7213 × 10^(−7) | C3 : −1.1862 × 10^(−5) |
| S2 | INFINITY | 0.00 | |
| S3 | 2.01312 | 1.70 | 1.62/1.60/1.60 |
| | K : −0.665816<br>A : 0.357976 × 10^(−2)<br>D : −0.306330 × 10^(−5) | B : 0.364474 × 10^(−3) | C : 0.864520 × 10^(−5) |
| S4 | −17.73749 | 1.64/1.79/1.37 | |
| | K : 42.307752<br>A : 0.137984 × 10^(−1)<br>D : −0.353051 × 10^(−4) | B : −0.328669 × 10^(−2) | C : 0.530088 × 10^(−3) |
| S5 | INFINITY | 0.6/0.6/1.2 | 1.62/1.58/1.57 |
| S6 | INFINITY | 0.0 | |
| EPD (mm) | | 4.00/4.00/3.10 | |
| WL (nm) | | 405/660/785 | |

FIG. 19

| SURFACE | RDY | THI | n |
|---|---|---|---|
| OBJ | INFINITY | INFINITY/INFINITY/INFINITY | |
| S1 | INFINITY<br>C1 : 1.0416 × 10^(-3)<br>C4 : -7.8546 × 10^(-6) | 0.50 | 1.53/1.51/1.51<br>C2 : -3.6796 × 10^(-4)<br>C5 : 2.7213 × 10^(-7)<br>C3 : -1.1862 × 10^(-5) |
| S2 | INFINITY<br>C1 : 3.8662 × 10^(-4)<br>C4 : -2.8358 × 10^(-6) | 0.00 | C2 : -8.8261 × 10^(-5)<br>C5 : -9.3163 × 10^(-8)<br>C3 : 9.4655 × 10^(-6) |
| S3 | 2.01312<br>K : -0.665816<br>A : 0.357976 × 10^(-2)<br>D : -0.306330 × 10^(-5) | 1.70 | 1.62/1.60/1.60<br>B : 0.364474 × 10^(-3)<br>C : 0.864520 × 10^(-5) |
| S4 | -17.73749<br>K : 42.307752<br>A : 0.137984 × 10^(-1)<br>D : -0.353051 × 10^(-4) | 1.64/1.73/1.37 | B : -0.328669 × 10^(-2)<br>C : 0.530088 × 10^(-3) |
| S5 | INFINITY | 0.6/0.6/1.2 | 1.62/1.58/1.57 |
| S6 | INFINITY | 0.0 | |
| EPD (mm) | | | 4.00/4.00/3.10 |
| WL (nm) | | | 405/660/785 |

FIG. 29

| SURFACE | RDY | THI | n |
|---|---|---|---|
| OBJ | INFINITY | INFINITY/INFINITY/INFINITY | |
| S1 | INFINITY | 0.50 | 1.53/1.51/1.51 |
| | C1 : 2.5827 × 10^(−3)<br>C4 : −1.3979 × 10^(−4) | C2 : −1.3654 × 10^(−3)<br>C5 : 1.8997 × 10^(−5) | C3 : −2.9448 × 10^(−05) |
| S2 | INFINITY | 0.00 | |
| | C1 : 2.3903 × 10^(−3)<br>C4 : −3.7090 × 10^(−5) | C2 : −6.2272 × 10^(−4)<br>C5 : −2.1319 × 10^(−6) | C3 : −4.9071 × 10^(−05) |
| S3 | 1.78821 | 2.20 | 1.84/1.79/1.79 |
| | K : −0.551388<br>A : 0.374127 × 10^(−2)<br>D : 0.620658 × 10^(−3) | B : 0.958068 × 10^(−3) | C : −0.637756 × 10^(−4) |
| S4 | 8.71252 | 0.96/0.77/0.41 | |
| | K : −59.811572<br>A : 0.339447 × 10^(−3)<br>D : 0.304889 × 10^(−3) | B : −0.810809 × 10^(−2) | C : −0.361386 × 10^(−3) |
| S5 | INFINITY | 0.1/0.6/1.2 | 1.62/1.58/1.57 |
| S6 | INFINITY | 0.0 | |
| EPD (mm) | | | 4.000/3.205/2.500 |
| WL (nm) | | | 405/660/785 |

OPTICAL PICKUP AND OPTICAL INFORMATION PROCESSING APPARATUS

This application is a continuation of application Ser. No. 11/138,519, filed May 27, 2005 now U.S. Pat. No. 7,450,486 which is hereby incorporated by reference in its entirety.

BACKGROUND OF THE INVENTION

1. Field of the Invention

The present invention relates to an optical pickup and an optical information processing apparatus using the optical pickup by which a satisfactory beam spot on an information recording surface of a blue-system optical recording medium which uses a light source of a blue wavelength zone, to a DVD-system optical recording medium using a light source of a red wavelength zone, or to a CD-system optical recording medium using a light source of an infrared wavelength zone.

2. Description of the Background Art

Optical recording media, such as a CD with a storage capacity of 0.65 GB and a DVD with a storage capacity of 4.7 GB, are known as means to store image information data, voice information, or computer data. Further, demands for further improvement in recording density and storage capacity have become stronger in recent years. Specifically, the necessity for storage capacity such as 22 GB by which a high-definition television program can be stored for two hours for recording one movie program, or for 44 GB by which the same can be stored for four hours for recording a sports relay broadcast or the like.

In an optical pickup which performs information writing or informational reading to/from an optical recording medium, in order to improve the recording density of such an optical recording medium, it is effective to reduce the diameter of the beam spot. The beam spot may be formed by a beam condensed by an object lens and formed on an optical recording medium by enlarging the numerical aperture (which may be abbreviated as 'NA') of the object lens, or by shortening the wavelength of the light emitted by a light source. Therefore, for example, in a "DVD-system optical recording medium" with which high recording density is achievable for which the NA of the object lens is 0.65 and the light source emits 660 nm wavelength light in comparison to a "CD-system optical recording medium" for which the NA of the object lens is 0.50 and the light source emits 780 nm wavelength light.

As for such an optical recording medium, as mentioned above, further improvement in the recording density and storage capacity is demanded, and, for this purpose, it is desirable to increase the NA of the object lens (i.e., make the NA greater than 0.65), or to make the wavelength of the light source shorter than 660 nm.

There are several new standards for optical recording media. One known standard is the "HD-DVD" standard. It uses a light source with an operating wavelength of 405 n-m and an object lens with an NA of 0.65 for an optical recording medium having a light-incidence-side substrate with a thickness of 0.6 mm. Another known standard is the "Blu-ray Disc" standard. The latter standard uses a light source with an operating wavelength of 405 nm and an object lens with an NA of 0.85 for an optical recording medium having a light-incidence-side substrate with a thickness of 0.1 mm.

Another problem is that users still have conventional recording medium such as CDs and DVDs. It is desirable that these conventional optical recording media and new optical recording media according to the above-mentioned new standard should be handled with a single common optical information processing device. A relatively easy method of solving this problem is that an optical pickup according to the conventional standard and an optical pickup according to the new standard are both mounted in one machine separately. However, this method may raise the cost or increase the size of the whole machine.

Thus, problems to be solved occurring when achieving an optical pickup directed to future high-density optical recording media are to reduce aberrations which otherwise increase due to increase in NA or reduction in wavelength, and, also, to achieve compatibility between the conventional standard and the new standard optical recording media (i.e., of different generations). Further, it is also a problem to be solved to achieve these objects without a remarkable increase in size/costs of the machine.

Furthermore, as described above, as long as the conventional recording media such as CDs and DVDs are applied, spherical aberration occurring in connection with a thickness error of the optical recording medium may be reduced by improving the manufacturing accuracy of the optical recording medium. Further, coma aberration in connection with an inclination of an optical recording medium may also be reduced by setting the substrate thickness at 0.1 mm, even when the light source of a blue wavelength zone and an object lens NA of 0.85 are applied.

However, in the future, in connection with achievement of high-speed rotation of an optical recording medium, application of a multi-layer-type optical recording medium, which will be described later, and also application of a multi-level recording scheme, it may not be possible to tolerate such aberration, and thus, a special scheme for correcting it should be needed.

For the above described problem, it is preferable to use three light sources for blue-system, DVD-system and CD-system optical recording medium with a single object lens for focusing an incident light beam from each light source. But there is a problem about aberration to focus for each blue-system, DVD-system and CD-system optical recording medium with a single object lens. For example, in the case of using a single object lens, which is designed for minimizing the wavefront aberration when it is used with an infinite optical system (a parallel beam is incident to the object lens) and with a blue-system optical recording medium ($\lambda 1=405$ nm, $NA(\lambda 1)=0.67$, substrate thickness $t1=0.6$ mm), for focusing a beam spot on a DVD recording medium ($\lambda 2=660$ nm, $NA(\lambda 2)=0.65$, substrate thickness $t2=0.6$ mm), there arises a spherical aberration shown in FIG. 2B due to the difference in the wavelength. At this point, the horizontal axis of FIG. 2B represents the distance from the optical axis, and the vertical axis of FIG. 2B represents wavefront aberration.

As in the above described case, in the case of using a single object lens, which is designed for minimizing the wavefront aberration when it is used with an infinite optical system and with a blue-system optical recording medium ($\lambda 1=405$ nm, $NA(\lambda 1)=0.67$, substrate thickness $t1=0.6$ mm), for focusing a beam spot on a CD recording medium ($\lambda=785$ nm, $NA(\lambda 3)=0.50$, substrate thickness $t3=1.2$ mm), there arises a spherical aberration shown in FIG. 2C due to the difference in the wavelength and also due to the difference in the thickness. To reduce such a spherical aberration, it is known to use a finite optical system (a non-parallel beam is incident on the object lens) as described in Japanese Patent No. 3240846. Generally, changing the divergence angle of the beam that is incident on the object lens is the same as changing the spherical aberration. A beam divergence angle may be selected to reduce the spherical aberration. For example, the wavefront aberration can be suppressed when the object distance of the CD optical system (the distance between the optical source and the object lens) is changed.

FIG. 3B shows the relationship between the object distance and the wavefront aberration. It is indicative of deterioration at the wavefront surface. As shown in the drawings, the deterioration at the wavefront surface is decreased around 50 mm of object distance. Although FIG. 3 shows no parts between the object lens and the light source, actually there are a wavelength plate, a prism and a lens, etc. between the object lens and the light source. In particular, an optical pickup corresponding to three kinds of optical discs (blue-system, DVD-system and CD-system) has a lot of parts, so the above described 50 mm of object distance is too short. It is a limitation for parts alignment. And coma aberration occurs from object lens shifts with tracking movement or focusing movement in the finite system.

According to the background art, there is an optical pickup comprising a hologram allocated next to the object lens. The light beam for CD-system is transformed by the hologram from an infinite-system to a finite-system. It is described in Japanese Laid-open Patent No. 2003-294926.

However, because the hologram described in Japanese Laid-open Patent No. 2003-294926 is a polarization selectable hologram, it is impossible to use in a polarization light system. Recently the polarization light system is used in many optical information recording apparatuses, because the polarization light system can increase the efficiency of using a light beam. So it is preferable to use a polarization light system to an optical pickup corresponding to three kinds of wavelengths (blue-system, DVD-system and CD-system).

SUMMARY OF THE INVENTION

An object of the present invention is to solve the above described problems, and to provide an optical pickup and an optical information processing apparatus that operate with three kinds of wavelengths (blue-system, DVD-system and CD-system) with one object lens to focus on three kinds of optical recording media (blue-system one, DVD-system one and CD-system one). More especially, an object of the present invention is to solve the above described problems, and to provide an optical pickup and an optical information processing apparatus having a polarization light system corresponding to three kinds of wavelengths by a wavelength selectable deflecting element correcting spherical aberration when the DVD-system medium or CD-system medium is used.

BRIEF DESCRIPTION OF THE DRAWINGS

Other objects and further features of the present invention will become more apparent from the following detailed description when read in conjunction with the following accompanying drawings:

FIG. 2A shows when the optical recording medium is for the blue-system, using a wavelength of 405 nm, NA of 0.67, Φ of 4.0 mm, infinite system incident light beam. FIG. 2B shows when the optical recording medium is for the DVD-system, using a wavelength of 660 nm, NA of 0.65, Φ of 4.0 mm, infinite system incident light beam. FIG. 2C shows when the optical recording medium is for the CD-system, using a wavelength of 785 nm, NA of 0.50, Φ of 3.1 mm, infinite system incident light beam;

FIG. 3A shows when the light path is the DVD-system one using an object lens which has an NA of 0.67. FIG. 3B shows when the light path is the CD-system's one using an object lens which has an NA of 0.67;

FIG. 4A shows when the light path is the DVD-system one with finite system or infinite system using a wavelength of 660 nm, NA of 0.64, Φ of 4.0 mm, and an object distance of 150 mm. FIG. 4B shows when the light path is the CD-system's one with finite system or infinite system using a wavelength of 785 nm, NA of 0.48, Φ of 3.1 mm, and an object distance of 50 mm. FIG. 4C shows when the light path is the DVD-system one with infinite system with aberration correction or with infinite system without aberration correction using a wavelength of 660 nm, NA of 0.65, Φ of 4.0 mm, and 1st order deflection. FIG. 4D shows when the light path is the CD-system one with infinite system with aberration correction or with infinite system without aberration correction using a wavelength of 785 nm, NA of 0.50, Φ of 3.1 mm, and 1st order deflection;

FIG. 5A shows when the light path is the DVD-system one with finite system. FIG. 5B shows when the light path is the CD-system one with finite system;

FIG. 6A shows the deflecting area, FIG. 6B shows a cross-sectional view of an aberration correcting deflecting area for CD-system, and FIG. 6C shows a cross-sectional view of limited numerical aperture deflecting area for CD-system;

FIG. 7A shows the transmission characteristics for the blue-system optical recording medium, FIG. 7B shows the transmission characteristics for the DVD-system optical recording medium, and FIG. 7C shows the transmission characteristics for the CD-system optical recording medium;

FIG. 8A shows the blue-system optical recording medium, FIG. 8B shows the DVD-system optical recording medium, and FIG. 8C shows the CD-system optical recording medium;

FIG. 9 shows specific data for the object lens according to a first embodiment of the present invention. In this case, the deflection order for S1 is zero-order for the blue-system light path, zero-order for the DVD-system light path, and 1st-order for the CD-system light path. RDY means curvature radius, THI means thickness, n means refractive index, C1 through C5 at S1 mean coefficients of deflecting surface, and K, A, B, C and D at S3 and S4 are coefficients of aspheric lens. The three numbers separated each word with slash mean for the blue-system light path for first number, for the DVD-system light path for second number and for the CD-system light path for third number;

FIG. 10A shows the blue-system optical recording medium, FIG. 10B shows the DVD-system optical recording medium, and FIG. 10C shows the CD-system optical recording medium;

FIG. 11A shows the transmission characteristics for the blue-system optical recording medium, FIG. 11B shows the transmission characteristics for the DVD-system optical recording medium, and FIG. 11C shows the transmission characteristics for the CD-system optical recording medium;

FIG. 17A shows the transmission characteristics for the blue-system optical recording medium, FIG. 17B shows the transmission characteristics for the DVD-system optical recording medium, and FIG. 17C shows the transmission characteristics for the CD-system optical recording medium;

FIG. 19 shows specific data for the object lens according to a second embodiment of the present invention. In this case, the deflection order for S1 is zero-order for the blue-system light path, zero-order for the DVD-system light path and 1st-order for the CD-system light path. The deflection order for S2 is zero-order for the blue-system light path, 1st-order for the DVD-system light path and zero-order for the CD-system light path. RDY means curvature radius, THI means thickness, n means refractive index, C1 through C5 at 1 mean coefficients of deflecting surface, and K, A, B, C and D at S3 and S4 are coefficients of aspheric lens. The three numbers separated each word with slash mean for the blue-system light path for first number, for the DVD-system light path for second number and for the CD-system light path for third number;

FIG. 20A is for the blue-system optical recording medium, FIG. 20B is for the DVD-system optical recording medium, and FIG. 20C is for the CD-system optical recording medium;

FIG. 21A shows the transmission characteristics for the blue-system optical recording medium, FIG. 21B shows the transmission characteristics for the DVD-system optical recording medium, and FIG. 21C shows the transmission characteristics for the CD-system optical recording medium;

FIG. 24A shows the transmission characteristics for the blue-system optical recording medium, FIG. 24B shows the transmission characteristics for the DVD-system optical recording medium, and FIG. 24C shows the transmission characteristics for the CD-system optical recording medium;

FIG. 25A shows when the optical recording medium is the blue-system one using a wavelength of 405 nm, NA of 0.85, Φ of 4.0 mm, and infinite system incident light beam. FIG. 25B shows when the optical recording medium is the DVD-system one using a wavelength of 660 nm, NA of 0.65, Φ of 3.2 mm, and infinite system incident light beam. FIG. 25C shows when the optical recording medium is the CD-system one using a wavelength of 785 nm, NA of 0.50, Φ of 2.5 mm, and infinite system incident light beam;

FIG. 26A shows when the light path is the DVD-system one using an object lens which has an NA of 0.85. FIG. 26B shows when the light path is the CD-system one using an object lens which has an NA of 0.85;

FIG. 27A shows when the light path is the DVD-system one with finite system or infinite system using a wavelength of 660 nm, NA of 0.64, Φ of 3.205 mm, and object distance of 37.5 mm. FIG. 27B shows when the light path is the CD-system one with finite system or infinite system using wavelength of 785 nm, NA of 0.47, Φ of 3.1 mm, and object distance of 26 mm;

FIG. 28A shows when the light path is the DVD-system one with finite system. FIG. 28B shows when the light path is the CD-system one with finite system;

FIG. 29 shows specific data for the object lens according to a third embodiment of the present invention. In this case, the deflection order for S1 is zero-order for the blue-system light path, zero-order for the DVD-system light path and 1st-order for the CD-system light path. The deflection order for S2 is zero-order for the blue-system light path, 1st-order for the DVD-system light path and zero-order for the CD-system light path. RDY means curvature radius, THI means thickness, n means refractive index, C1 through C5 at S1 mean coefficients of deflecting surface, and K, A, B, C and D at S3 and S4 are coefficients of aspheric lens. The three numbers separated each word with slash mean for the blue-system light path for first number, for the DVD-system light path for second number and for the CD-system light path for third number;

FIG. 30A is for the blue-system optical recording medium, FIG. 30B is for the DVD-system optical recording medium, and FIG. 30C is for the CD-system optical recording medium;

FIG. 31A shows when the light path is the DVD-system one with infinite system with aberration correction or with infinite system without aberration correction using a wavelength of 660 nm, NA of 0.65, and Φ of 3.205 mm. FIG. 31B shows when the light path is the CD-system one with infinite system with aberration correction or with infinite system without aberration correction using a wavelength of 785 nm, NA of 0.51, Φ of 2.5 mm;

FIG. 32A shows the transmission characteristics for the blue-system optical recording medium, FIG. 32B shows the transmission characteristics for the DVD-system optical recording medium, and FIG. 32C shows the transmission characteristics for the CD-system optical recording medium;

DETAILED DESCRIPTION OF PREFERRED EMBODIMENTS

With reference to the accompanying figures, preferred embodiments of the present invention will now be described.

Figure 1:
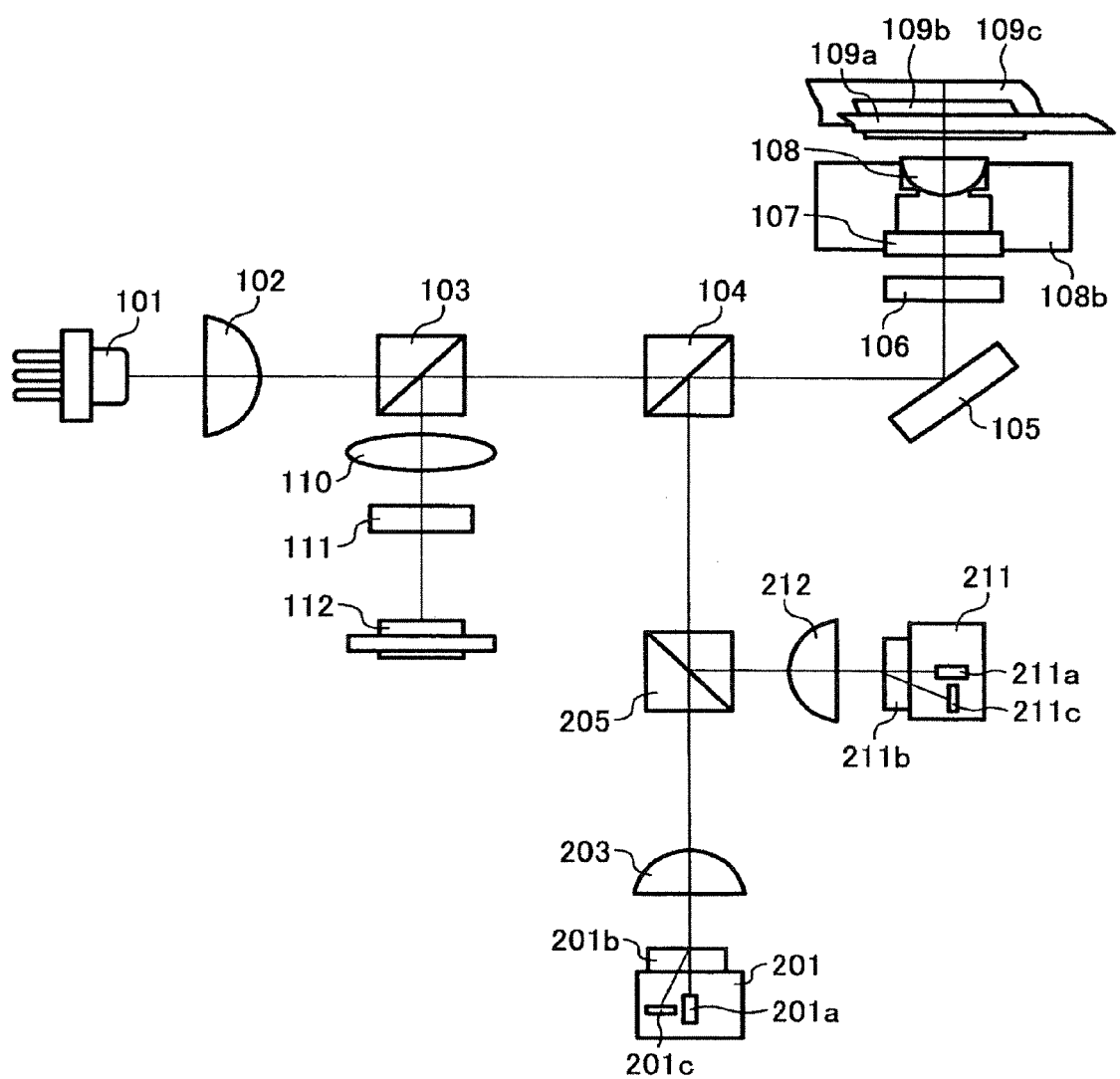
FIG. 1 shows a general configuration of an optical pickup according to a first embodiment of the present invention.

FIG. 1 shows a general configuration of an optical pickup according to a first embodiment of the present invention. By this optical pickup, information recording, reproduction or deletion is performed on each of a blue-system optical recording medium, with an operating wavelength of 405 nm, an NA of 0.67, and a light-incident side substrate thickness of 0.6 mm; a DVD-system optical recording medium, with an operating wavelength of 660 nm, an NA of 0.64, and a light-incident side substrate thickness of 0.6 mm; and a CD-system optical recording medium, with an operating wavelength of 785 nm, an NA of 0.50 and a light-incident side substrate thickness of 1.2 mm.

As shown in FIG. 1, in this optical pickup, a blue-system through which light with a wavelength of 405 nm passes, includes a semiconductor laser 101 with a wavelength of 405 nm, a collimator lens 102, a polarization beam splitter 103, a trichroic prism 104, a polarization prism 105, a wavelength plate 106, a wavelength selectable deflecting element 107, an object lens 108, a detection lens 110, a beam splitting device 111, and a light-receiving device 112.

Furthermore, a DVD-finite-system through which light with a wavelength of 660 nm passes includes a hologram unit 201, a coupling lens 203, a dichroic prism 205, the trichroic prism 104, the polarization prism 105, the wavelength plate 106, the wavelength selectable deflecting element 107, and the object lens 108.

A CD optical system through which light with a wavelength of 785 nm passes includes a hologram unit 211, a coupling lens 212, the dichroic prism 205, the trichroic prism 104, the polarization prism 105, the wavelength plate 106, the wavelength selectable deflecting element 107, and the object lens 108.

That is, the dichroic prism 205, the trichroic prism 104, the polarization prism 105, the wavelength plate 106, the wavelength selectable deflecting element 107, and the object lens 108 are common parts for the above-mentioned two or three optical systems.

The object lens 108 is designed so that the spherical aberration occurring when an infinite system is applied is minimum, especially for a blue-system optical recording medium with an operating wavelength of 405 nm, an NA of 0.67, and a light-incident side substrate thickness of 0.6 mm.

The object lens 108 and the wavelength selectable deflecting element 107 are on an actuator 108b, and are able to move in the focusing direction and the tracking direction.

As for optical recording media 109a, 109b, and 109c to be loaded, these optical recording media have substrate thicknesses and operating wavelengths different from each other. Specifically, the blue-system optical recording medium 109a has a substrate thickness of 0.6 mm; the DVD-system optical recording medium 109b has a substrate thickness of 0.6 mm; and the CD-system optical recording medium 109c has a substrate thickness of 1.2 mm. During information recording or reproduction, on a rotation mechanism not shown, one optical recording medium thereof is loaded, and, is thereby rotated at high speed.

In the above-described optical pickup, a case where information recording, reproduction or deletion is performed on the blue-system optical recording medium, with an operating wavelength of 405 nm, an NA of 0.67, and a light-incident side substrate thickness of 0.6 mm will now be described. A beam emitted in a linear polarization from the semiconductor laser 101 with a wavelength of 405 nm is transformed into an approximately parallel beam by the collimator lens 102, and then, passes through the polarization beam splitter 103 and the trichroic prism 104. After that, the light path is deflected 90 degrees by the polarization prism 105, and the beam then passes through the wavelength plate 106, by which it is transformed into a circular polarization. After that, the beam then passes through the wavelength selectable deflecting element 107, no effect is provided at all, and then it is incident on the object lens 108, by which it is focused into a minute spot on the optical recording medium 109a. Informational recording, reproduction, or deletion is performed by this spot on the optical recording medium.

After being reflected by the optical recording medium 109a, the light has a circular polarization in the direction opposite to that in the above-mentioned case of coming into the optical recording medium. The light is transformed into an approximately parallel beam again, is transformed into a linear polarization perpendicular to that in the above-mentioned case of coming into the optical recording medium by the wavelength plate 106, and is reflected by the polarization beam splitter 103, converged by the detection lens 110, and deflected in a splitting manner by the beam splitting device 111 into a plurality of beams, which are then incident on the light-receiving device 112. From the light-receiving device 112, an aberration signal, an information signal, and a servo signal are detected.

Next, a case will now be described involving information recording, reproduction or deletion on the DVD-system optical recording medium with the operating wavelength of 660 nm, an NA of 0.65, and a light-incident side substrate thickness of 0.6 mm. As mentioned above, light receiving/emitting devices are installed in a pickup for a DVD system into one unit, and such a hologram unit which separates an incident beam using a hologram is generally used, and, as such, the hologram unit 201 shown in FIG. 1 integrally includes a semiconductor laser 201 a, a hologram 201b, and a light-receiving device 201c. The 660 nm light which comes out of the semiconductor laser 201a of the hologram unit 201 passes through the hologram 201b and thus, is transformed into a predetermined unparallel beam by the coupling lens 203. Then, the beam is transmitted through the dichroic prism 205, which transmits light in a red wavelength zone while it reflects light in an infrared wavelength zone. The beam is reflected by the trichroic prism 104 which transmits light in a blue wavelength zone while it reflects light in a red wavelength zone, in the direction toward the polarization prism 105. The polarization prism 105 deflects the light path 90 degrees, and the wavelength plate 106 then transforms the beam into a circular or elliptic polarization, and with the wavelength selectable deflecting element 107, no effect is provided at all, and the beam then is incident on the object lens 108, by which the beam is focused into a minute spot on the optical recording medium 109b. Informational recording, reproduction, or deletion is performed by this spot on the optical recording medium.

After being reflected by the optical recording medium 109b, the beam is reflected by the polarization prism 105, reflected by the trichroic prism 104, converged by the coupling lens 203, and diffracted by the hologram 201b in the direction toward the light-receiving device 201c, which is held in the same unit as the semiconductor laser 201a. From the light-receiving device 201c, an aberration signal, an information signal, and a servo signal are detected.

A case will now be described where information recording, reproduction, or deletion is performed on the CD-system optical recording medium with an operating wavelength of 785 nm, an NA of 0.50, and a light-incident side substrate thickness of 1.2 mm. As in the above-described case for a DVD system, a pickup of CD system also has light receiving/emitting devices in one unit, and, a hologram unit which separates beams using a hologram is used generally. As such, the hologram unit 211 shown in FIG. 1 integrally includes a semiconductor laser 211a, a hologram 211b, and a light-receiving device 211c, as in the hologram unit 201. A 785 nm light, which comes out of the semiconductor laser 211a of the hologram unit 211, passes through the hologram 211b, and is made into a parallel light by the collimator lens 212. After that, this light is reflected by the dichroic prism 205 which transmits light in the red wavelength zones while it reflects each of lights in the blue and infrared wavelength zones, and is reflected by the trichroic prism 104 which transmits light in the blue wavelength zone while it reflects each of lights in the red and infrared wavelength zones, in the direction toward the polarization prism 105. The polarization prism 105 deflects the light path 90 degrees. The wavelength plate 106 transforms the light into an elliptic polarization or a circular polarization, and the light is controlled in its cross section into NA: 0.50 with the wavelength selectable deflecting element 107. The beam is deflected for 1st order by the wavelength selectable deflecting element 107 to make a minute spot. After that, the light is incident on the object lens 108, and thereby, it is focused into a minute spot on the optical recording medium 109c. Informational recording, reproduction, or deletion is performed by this spot on the optical recording medium 109c.

After being reflected by the optical recording medium 109c, the light is deflected by the polarization prism 105, reflected by the trichroic prism 104, reflected by the dichroic prism 205, converged by the collimator lens 212, and diffracted by the hologram 211b in the direction toward the light-receiving device 211c, which is held in the same unit as the semiconductor laser 211a. From the light-receiving device 211c, an aberration signal, an information signal, and a servo signal are detected. From light-receiving device 211c, an aberration signal, an information signal, and a servo signal are detected.

Next, a case will be described where the wavelength selectable deflecting element is used for compatibility with the blue-system, operating wavelength of 660 nm and NA: 0.65, DVD-system and CD-system.

Figure 2A:
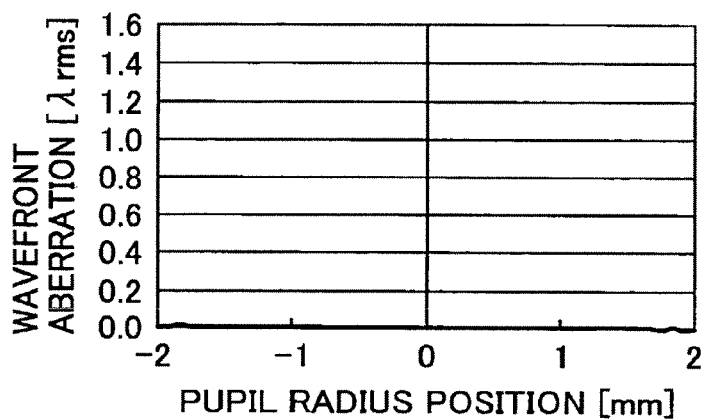
FIGS. 2A through 2C show wavefront aberrations focusing on an optical recording medium according to a first embodiment of the present invention.
Figure 2B:
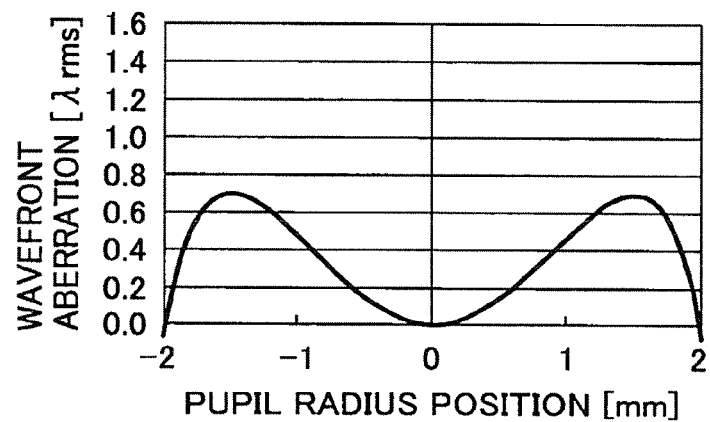
Figure 2C:
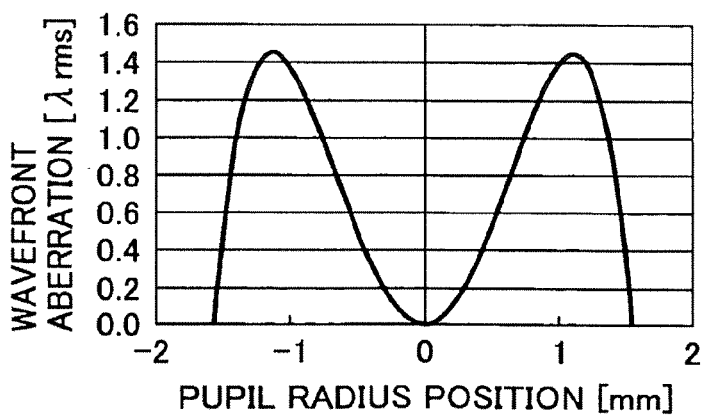

FIG. 2A shows when the optical recording medium is for the blue-system, with a wavelength of 405 nm, an NA of 0.67, δ of 4.0 mm, infinite system incident light beam. FIG. 2B shows when the optical recording medium is for the DVD-system, with a wavelength of 660 nm, NA of 0.65, Φ of 4.0 mm, infinite system incident light beam. FIG. 2C shows when the optical recording medium is for the CD-system, with a wavelength of 785 nm, NA of 0.50, δ of 3.1 mm, infinite system incident light beam.

Figure 3A:
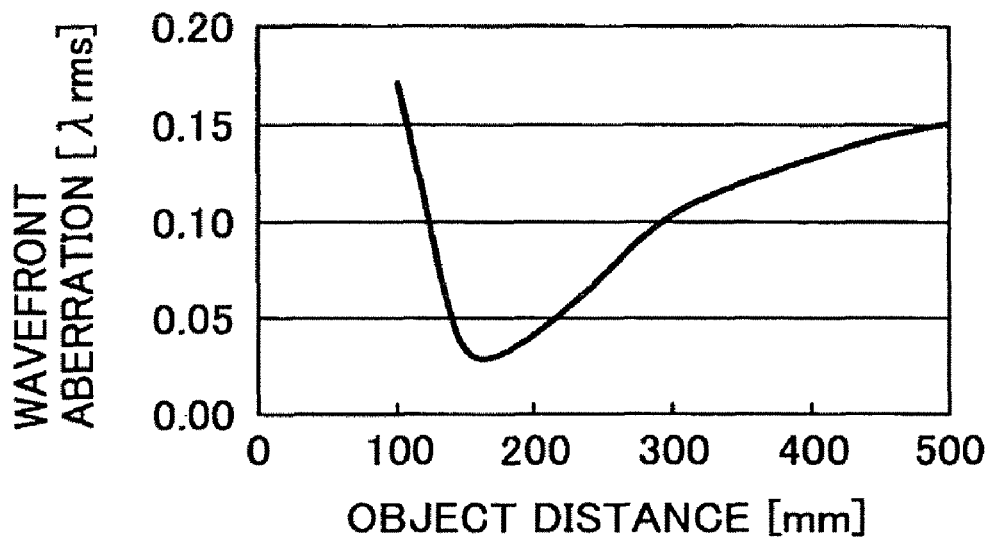
FIGS. 3A and 3B show relationships between the object distance and the wavefront aberration according to a first embodiment of the present invention.
Figure 4A:
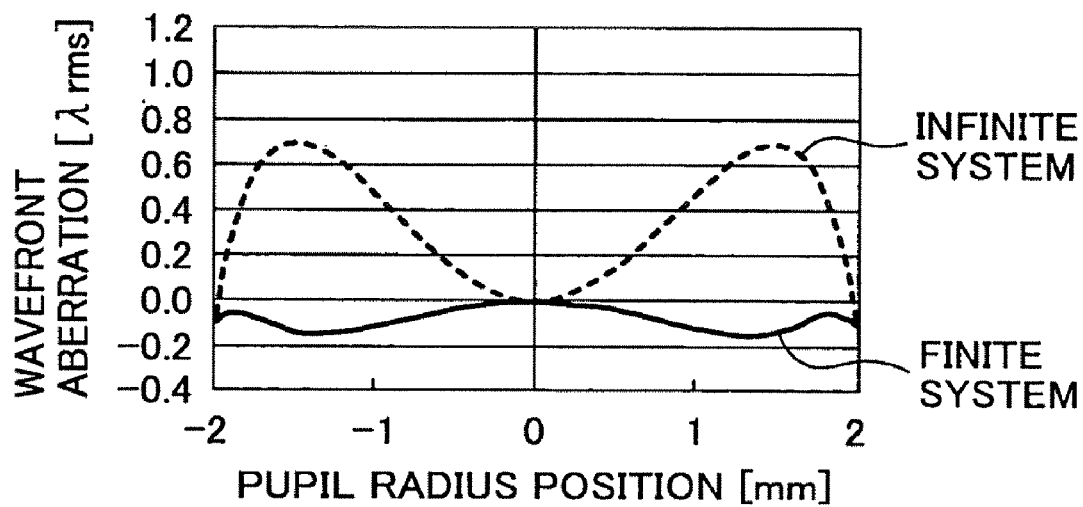
FIGS. 4A through 4D show wavefront aberrations according to a first embodiment of the present invention.
Figure 4B:
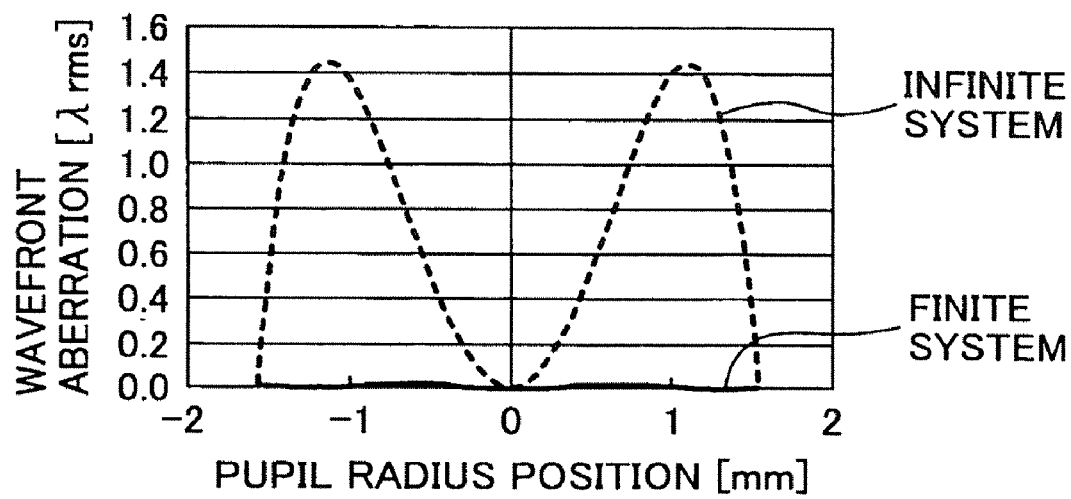
Figure 4C:
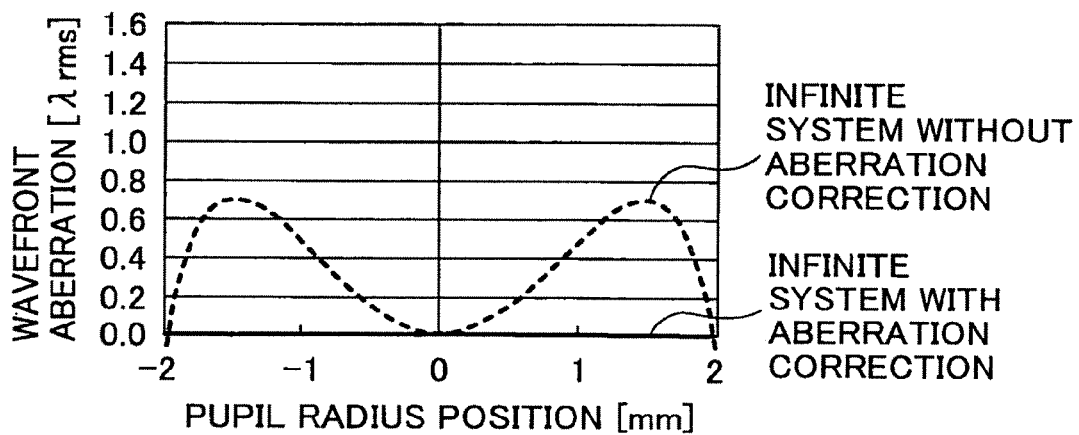

The single object lens 108 has optimum aberration characteristics at a wavelength of 405 nm and a substrate thickness of 0.6 mm (as shown in FIG. 2A). When light with a wavelength of 660 nm, in an infinite system, is incident on the single object lens 108, a beam spot is formed on the DVD-system optical recording-medium 109b, with a substrate thickness 0.6 mm, and the wavefront aberration is shown in FIG. 2B. The horizontal axis of FIG. 2B represents a pupil radius position and the vertical axis of FIG. 2B represents wavefront aberration. FIG. 2B shows a two dimensional cross-sectional shape of phase differential distribution, but actually, there is a three dimensional distribution and it has rotational symmetry around the vertical axis. The DVD-system light path according to a first embodiment of the present invention has a finite-system to correct the aberration. FIG. 3A shows the relationship between the object distance and the wavefront aberration when the light path is the DVD-system one using an object lens which has an NA of 0.67. The wavefront aberration is minimum around the object distance of 150 mm. FIG. 4A shows a wavefront aberration when the light path is the DVD-system one with a finite or infinite system using a wavelength of 660 nm, NA of 0.64, Φ of 4.0 mm and object distance of 150 mm.

Figure 3B:
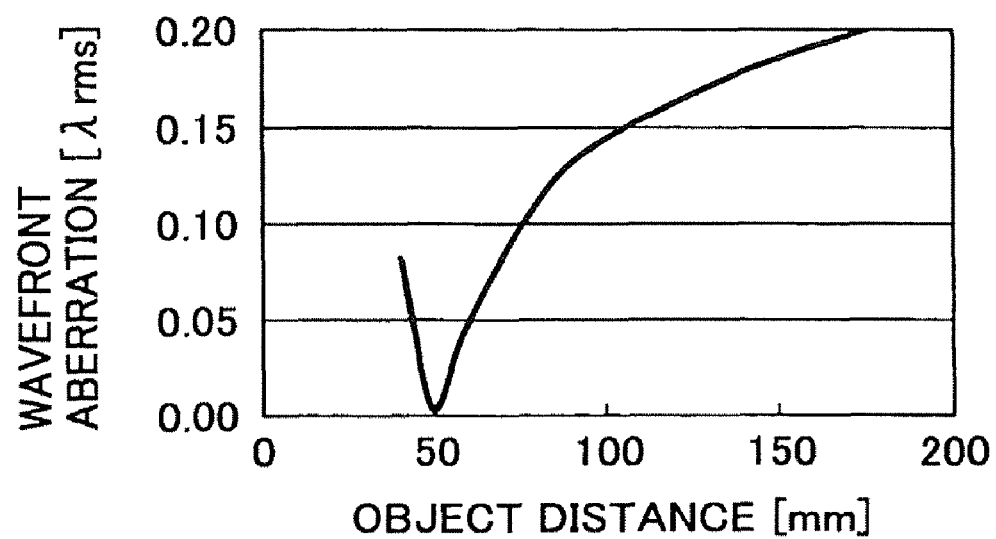
Figure 5A:
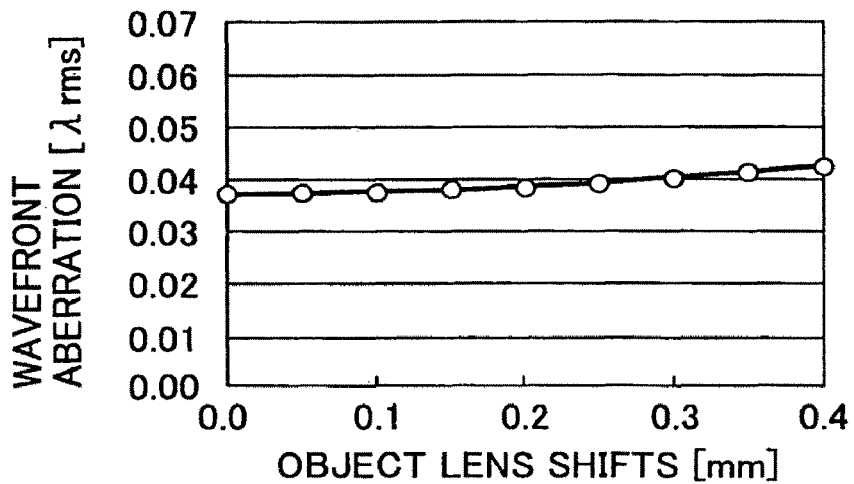
FIGS. 5A and 5B show relationships between the object lens shifts and wavefront aberration according to a first embodiment of the present invention.
Figure 5B:
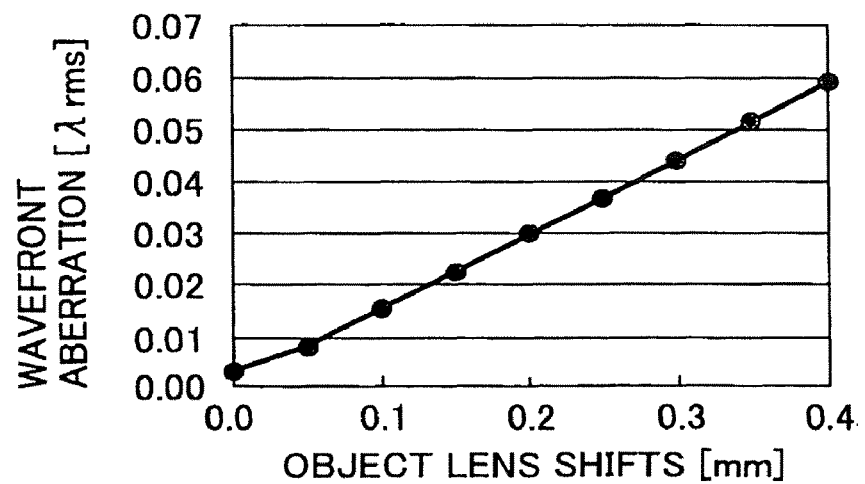

Same as above, when light with a wavelength of 785 nm is incident on the single object lens 108, with an infinite system, a beam spot is formed on the CD-system optical recording-medium 109c, which has a substrate thickness of 1.2 mm, and the wavefront aberration is shown in FIG. 2C. The horizontal axis of FIG. 2C represents a pupil radius position and the vertical axis of FIG. 2C represents a wavefront aberration. FIG. 3B shows the relationship between the object distance and the wavefront aberration when the light path is the CD-system one using an object lens which has an NA of 0.50. The wavefront aberration is minimum around the object distance of 50 mm. But the object distance at the minimum wavefront aberration is shorter than the DVD-system one. As above described, there is a problem from the effect of the object lens shifts. FIGS. 5A and 5B show relationships between the object lens shifts and the wavefront aberration. FIG. 5A shows when the light path is the DVD-system one with finite system. FIG. 5B shows when the light path is the CD-system one with finite system. It is preferable that the object lens shift is 0.3 mm to 0.4 mm, but especially, the deterioration in the CD-system is close to Marecial's criterion of 0.07 λrms, which is an upper limitation of wavefront aberration generally.

As above described, it is preferable to use the infinite-system in the CD-system. In a first embodiment of the invention, the spherical aberration at incident with infinite-system is corrected by the wavelength selectable deflecting element 107.

Figure 6A:
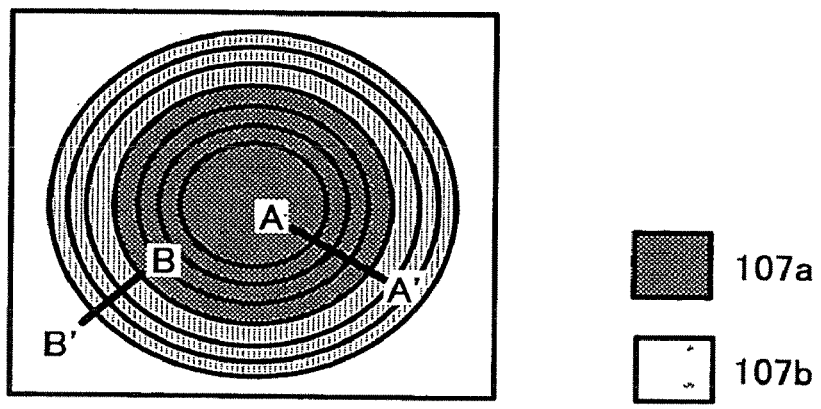
FIGS. 6A through 6C show structures of a wavelength selectable deflecting element according to a first embodiment of the present invention.
Figure 6B:
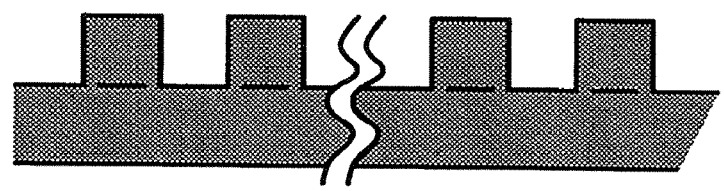

The wavelength selectable deflecting element 107 of the first embodiment of this invention is not the same as the deflecting element described in Japanese Patent No. 3240846. The wavelength selectable deflecting element 107 has a wavelength selectable deflecting area. Therefore, it becomes possible to use a polarization light system. Generally, a polarization selectable deflecting element has a complicated structure, for example, a sandwich of isotropic material and birefringence material between glass substrates. But a wavelength selectable deflecting element has a simple structure, for example, with a deflect surface on glass or plastic substrate. The deflecting area may be a plural ring with a center on the incident light beam axis as shown in FIG. 6A. The cross-section of the deflecting area may have a rectangular shape as shown in FIG. 6B. There are methods for making the deflect area, for example, use photolithography technology, or precision cutting by diamond turning tool.

Figure 7A:
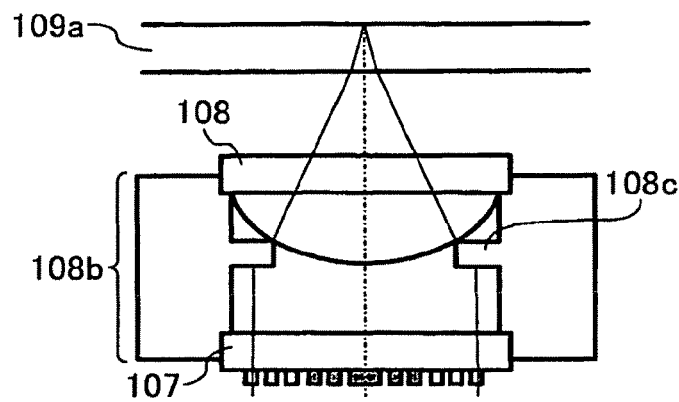
FIGS. 7A through 7C show transmission characteristics of light beam at the wavelength selectable deflecting element with the aberration correcting deflecting area for CD-system and the limited numerical aperture deflecting area for CD-system according to a first embodiment of the present invention.
Figure 7B:
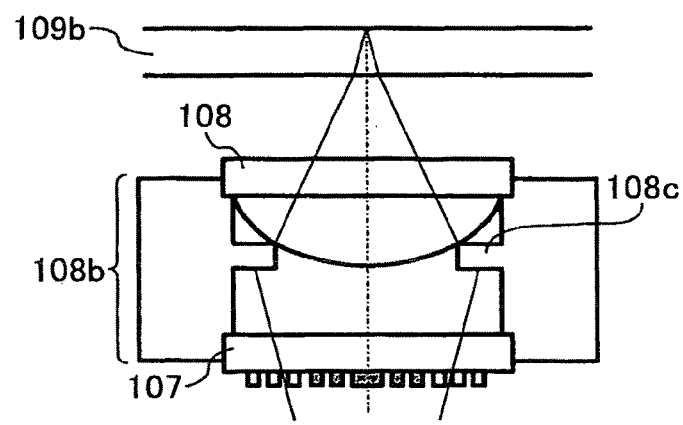
Figure 7C:
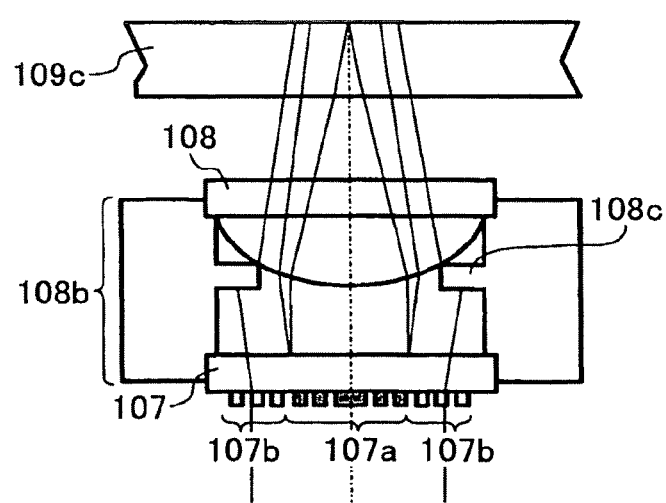

The aberration correcting deflecting area for CD-system 107a emits a zero-order deflected light beam when the incoming light beam has a wavelength of 405 nm as shown in FIG. 7A. In other words, for a light beam having a wavelength of 405 nm, the aberration correcting deflecting area for CD-system 107a provides no effect at all. The zero-order deflected light beam is focused onto the blue-system optical recording medium 109a by the object lens 108. The aberration correcting deflecting area for CD-system 107a also emits a zero-order deflected light beam when a light beam having a wavelength of 660 nm is incoming as shown in FIG. 7B. In other words, for a light beam having a wavelength of 660 nM, the aberration correcting deflecting area for CD-system 107a provides no effect at all. The zero-order deflected light beam is focused onto the DVD-system optical recording medium 109b by the object lens 108. On the other hand, the aberration correcting deflecting area for CD-system 107a emits 1st-order deflected light beam when a light beam having a wavelength of 785 nm is incoming as shown in FIG. 7C. As above described, the aberration correcting deflecting area for CD-system 107a transmits a light beam in a blue wavelength zone and also transmits a light beam in a red wavelength zone. But the aberration correcting deflecting area for CD-system 107a deflects a light beam in an infrared wavelength zone.

Figure 4D:
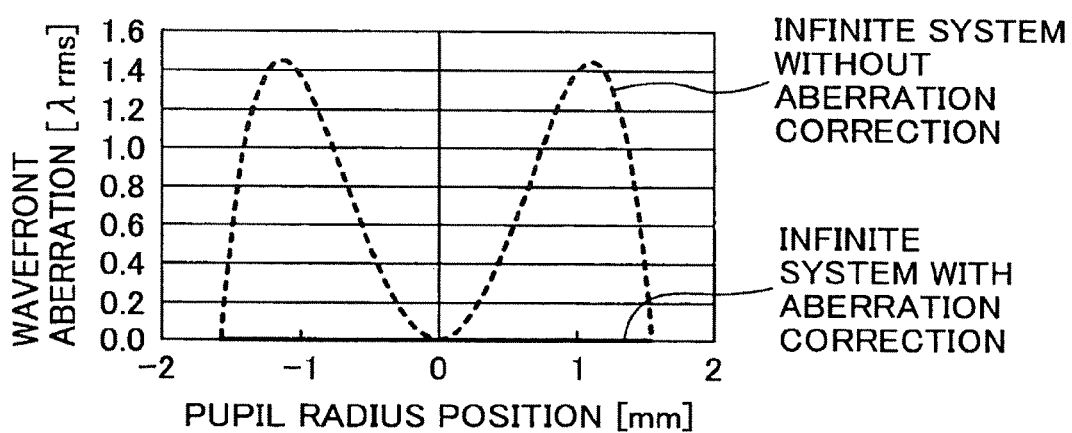

The deflecting ratio is designed to correct the spherical aberration in the object lens for the light beam having a wavelength of 785 nm and the spherical aberration in the substrate of the CD-system optical recording medium 109c for the light beam having a wavelength of 785 nm. As such, it becomes possible to focus the light beam having a wavelength of 785 nm onto the CD-system optical recording medium 109c. FIG. 4D shows a wavefront aberration when the light path is the CD-system one with infinite system with aberration correction or with infinite system without aberration correction, using a wavelength of 785 nm, an NA of 0.50, δ of 3.1 mm, and 1st order deflection.

Figure 8A:
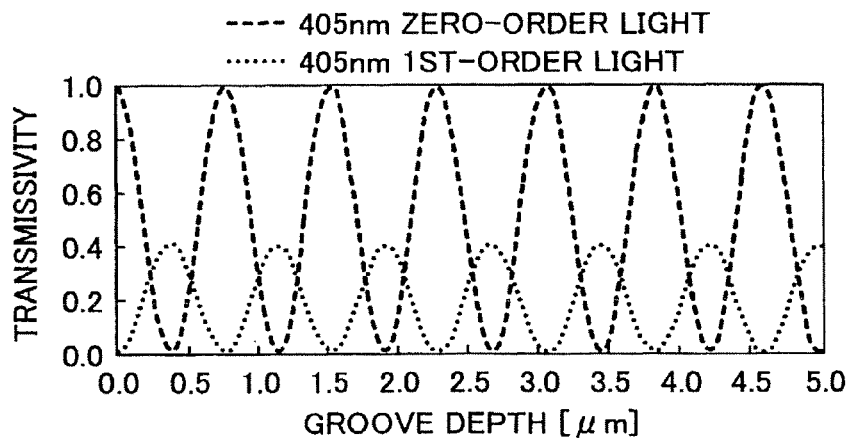
FIGS. 8A through 8C show the relationship between transmissivity and groove depth of the deflecting pattern for CD-system according to a first embodiment of the present invention.
Figure 8B:
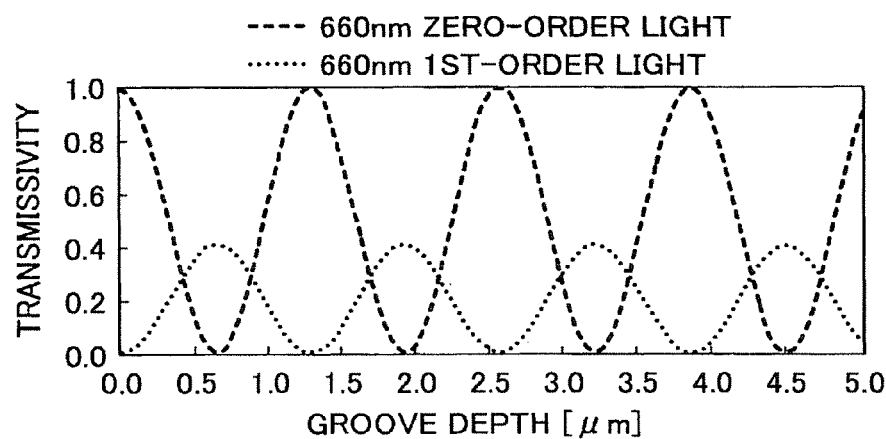
Figure 8C:
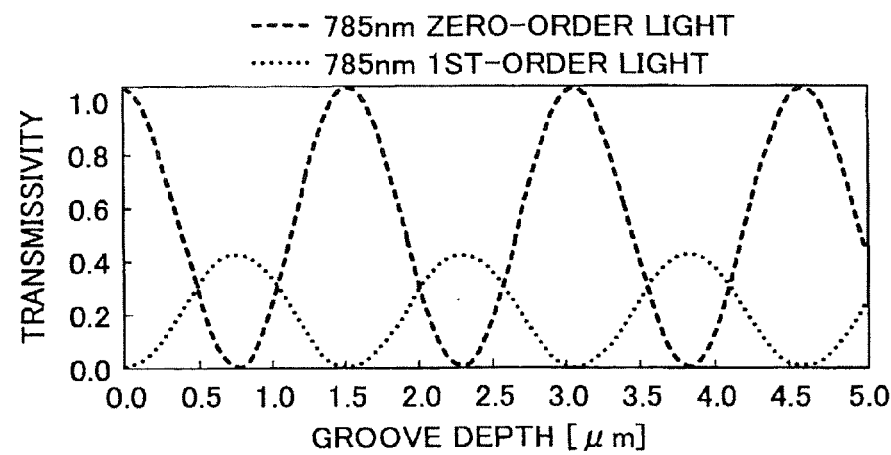

FIG. 6B is a cross-sectional view of an aberration correcting deflecting area for a CD-system wavelength selectable deflecting element. Because a phase difference of frequently concave and convex shape at the cross-section is to be $2\pi$ times of 405 nm and 660 nm, it becomes possible to have zero-order transmissivity for the light beam having a wavelength of 405 nm and 660 nm and have 1st-order diffraction efficiency for the light beam having a wavelength of 785 nm. FIGS. 8A through 8C show the relationship between transmissivity and groove depth of the deflecting pattern for the CD-system. FIG. 8A shows the blue-system optical recording medium, FIG. 8B shows the DVD-system optical recording medium, and FIG. 8C shows the CD-system optical recording medium. The zero-order transmissivity for the light beam having a wavelength of 405 nm and 660 nm becomes almost 100% around the groove depth of 3.8 μm. The 1st-order diffraction efficiency for the light beam having a wavelength of 785 nm becomes almost 100% around the groove depth of 3.8 μm. Because it is easy to make a shallow groove, the groove depth should preferably be the least common multiple of 405 nm and 660 nm.

Next, specific data for the shape of the object lens and the wavelength selectable deflecting element will be provided.

An aspheric shape of a lens surface is defined by the following formula:

$$X=(Y^2/R)/[1+\sqrt{\{1-(1+K)\ Y/R^2\}}+AY^4+BY^6+CY^8+DY^{10}+EY^{12}+FY^{14}+\ldots]$$

where

X denotes the coordinate along the optical axis direction; Y denotes the coordinate along the direction perpendicular to the optical axis; R denotes the paraxial curvature radius; K denotes the cone constant; A, B, C, D, E, F . . . denote high-order coefficients, shown in the table of lens data of FIG. 9.

The phase function of a deflecting element is defined by the following formula:

$$\Phi(r)=m(2\pi/\lambda)\ (C1+C2\ r^2+C3\ r^4+C4\ r^6+C5\ r^8+\ldots)$$

where m denotes the deflection order; λ denotes the wavelength; r denotes the radius from the optical axis; C1, C2, C3, C4, C5, . . . denote coefficients, shown in the table of lens data of FIG. 9.

The object lens according to a first embodiment of this invention has an operating wavelength of 405 nm; NA of 0.67; f of 3.00 mm; and n of 1.59; vd of 61.3, shown in the table of lens data of FIG. 9. In FIG. 9, "OBJ" represents the object point (laser diode used for optical source). Because the object lens 108 forms the infinite-system for the wavelength of 405 nm and 785 nm, "INFINITY" for the curvature radius RDY and the thickness THI means that the optical source is located at the infinite distance. On the other hand, the DVD-system is finite-system and the object distance is 150 mm. Here, all the quantities having the dimension of length are represented by "mm".

SI represents a surface of the wavelength selectable deflecting element 107 at the side of the optical source, S2 represents a surface of the wavelength selectable deflecting element 107 at the side of the optical recording medium, S3 represents the lens surface of the object lens 108 at the side of the optical source, S4 represents the lens surface of the object lens 108 at the side corresponding to the optical recording medium. The objective lens 108 has a thickness of 1.70 mm, and the thickness value "1.64 mm" for THI in the column for S4 represents the "working distance." Further, S5 represents the surface of the optical recording medium 109 irradiated with the optical beam and hence located at the side of the optical source, S6 represents the opposite side surface of the optical recording medium 109 (at the side of the optical source). The distance between S5 and S6 (the substrate thickness) is 0.6 mm for the blue-system optical recording medium, 0.6 mm for the DVD-system optical recording medium, and 1.2 mm for the CD-system optical recording medium. EPD represents an incident pupil diameter. EPD is 4.0 mm for the blue-system and the DVD-system, and 3.1 mm for the CD-system. WL represents the wavelength.

Figure 10A:
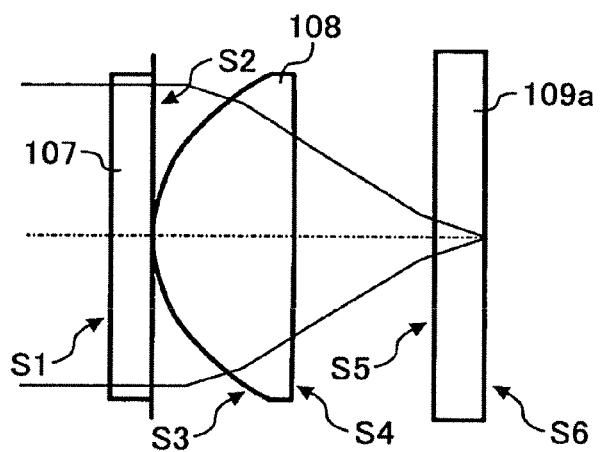
FIGS. 10A through 10C show a lens shape corresponding to the specific data shown in FIG. 9.
Figure 10B:
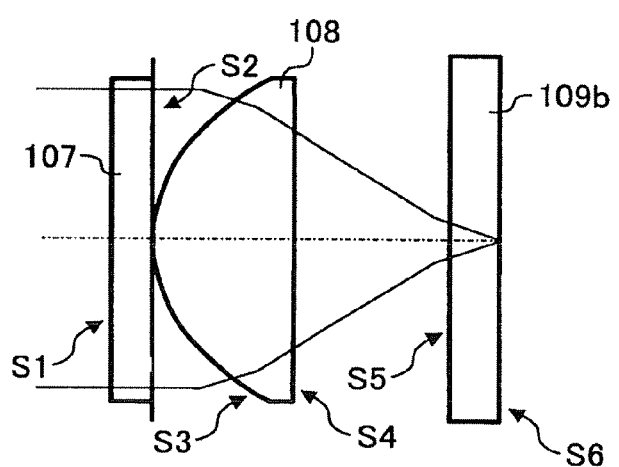
Figure 10C:
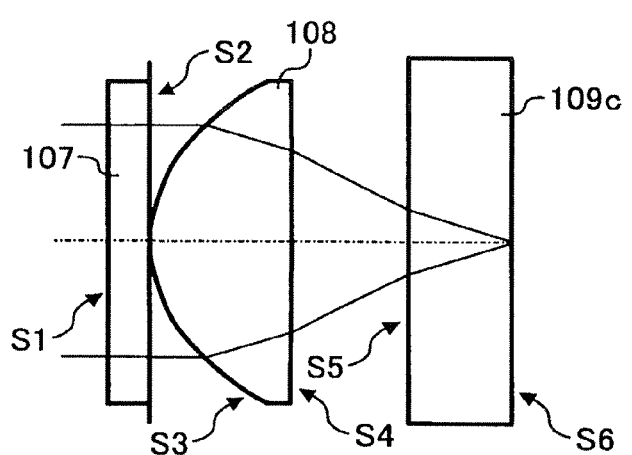

The wavefront aberration in the optical system using the above described object lens and wavelength selectable deflecting element is 0.0020 λrms for the blue-system, 0.0371 λrms for the DVD-system, and 0.0001 λrms for the CD-system using a 1st-order deflecting light beam. They are under the Marecial's criterion of 0.07 λrms. FIGS. 10A through 10C show a lens shape corresponding to the specific data of FIG. 9. FIG. 10A is for the blue-system optical recording medium, FIG. 10B is for the DVD-system optical recording medium, and FIG. 10C is for the CD-system optical recording medium.

In FIG. 7, the aberration correcting deflecting area for CD-system 107a is located at the light source side of the wavelength selectable deflecting element 107, but it may be located at the side of the optical recording medium. Also the aberration correcting deflecting area for the CD-system 107a may be on the object lens. These are the same as in other embodiments.

Next, a case will now be described a condition related with the NA and the light beam diameter. It is necessary to switch the numerical aperture (NA) value according to the optical recording medium. Therefore, NA is 0.67 for the blue-system optical recording medium, 0.64 for the DVD-system optical recording medium, and 0.50 for the CD-system optical recording medium.

The NA is defined by the following formula:

$$NA(\lambda)=\Phi(\lambda)/2/f(\lambda)$$

where f denotes the focal distance of the object lens; and Φ denotes an effective diameter of the light beam used for focusing.

According to the above described, because the focal distances for the blue-system and the DVD-system are 3.00 and 3.10 mm, respectively, the NA almost satisfies the recommended DVD and HD-DVD standards when Φ is 4.00 mm.

Generally, because the focal distance is longer when the wavelength is longer, it is preferable to choose the effective diameter for the NA a little bit lower from 0.65 for the DVD-system, and an NA a little bit higher from 0.65 for the blue-system. However, because the focal distance for the CD-system is 3.12 mm, it is necessary to use a numerical aperture switching means to obtain an NA of 0.5. To solve this problem, in this embodiment, there is a wavelength selectable numerical aperture limiting area for switching the light beam diameter by reflecting or deflecting corresponding to wavelength.

As above described, it is necessary to switch the numerical aperture for wavelengths of 405 nm and 660 nm and for a wavelength of 785 nm. To switch the numerical aperture, the light beam is limited by an aperture 108c in an actuator 108b for wavelengths of 405 nm and 660 nm as shown in FIG. 7A, FIG. 7B and FIG. 7C. And also to switch the numerical aperture, the light beam is limited by a numerical aperture limiting deflecting area for the CD-system 107b. It is located around the aberration correcting deflecting area for the CD-system 107a, to switch the light beam diameter corresponding to the wavelength of the light beam emitted from the light source for wavelength of 785 nm as shown in FIG. 7C. FIG. 7A shows the transmission characteristics for the blue-system optical recording medium, FIG. 7B shows the transmission characteristics for the DVD-system optical recording medium, and FIG. 7C shows the transmission characteristics for the CD-system optical recording medium. The numerical aperture limiting deflecting area for the CD-system 107b transmits a light beam in a blue wavelength zone and also transmits a light beam in a red wavelength zone. But the numerical aperture limiting deflecting area 107b deflects a light beam in an infrared wavelength zone for 1st-order deflecting light beam.

Figure 6C:
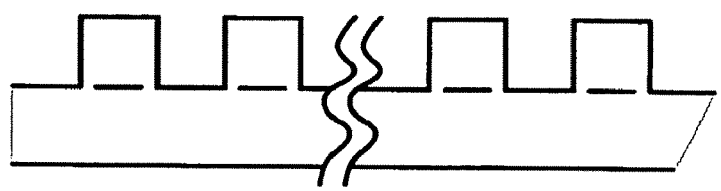

FIG. 6C is a cross-sectional view of the deflecting pattern of the numerical aperture limiting deflecting area 107b. Because a phase difference of frequently concave and convex cross-section is to be 2π times of 405 nm and 660 nm, it becomes possible to reduce a 1st-order diffraction efficiency for the light beam having wavelength of 405 nm and 660 nm and have a 1st-order diffraction efficiency for the light beam having a wavelength of 785 nm the same as the aberration correcting deflecting area for CD-system shown in FIG. 6B and FIG. 7.

A light beam emitted from the light source and deflected by the numerical aperture limiting deflecting area for CD-system 107b is scattered to avoid overlapping with the focused light spot.

Figure 11A:
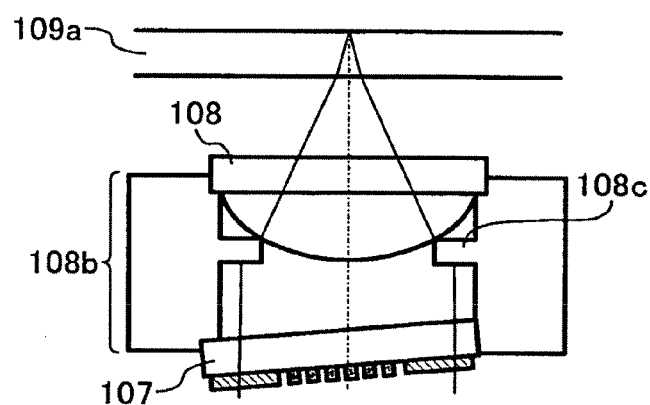
FIGS. 11A through 11C show transmission characteristics of a light beam at the wavelength selectable deflecting element with a limited numerical aperture coating area for CD-system according to another example of the first embodiment of the present invention.
Figure 11B:
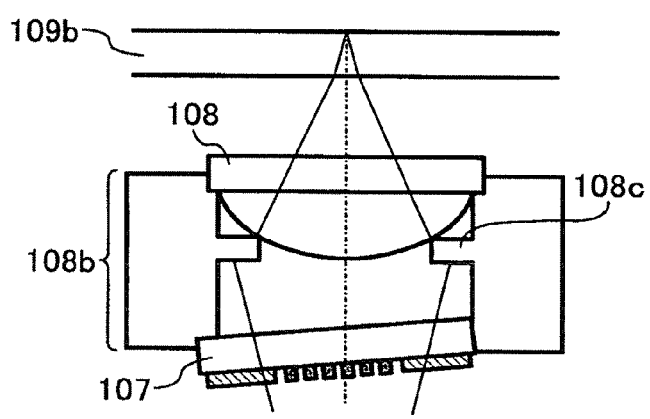
Figure 11C:
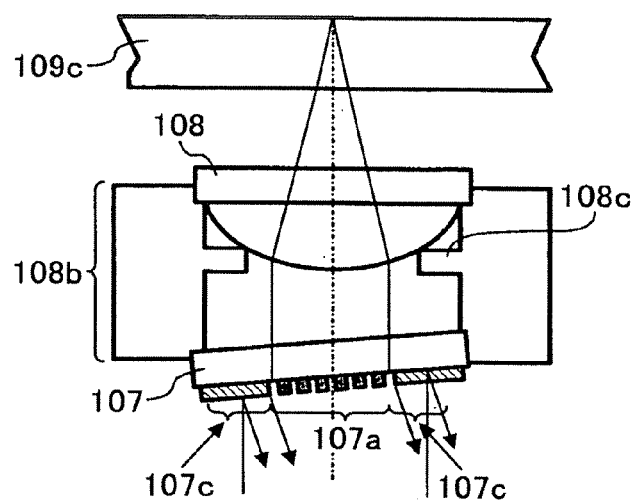
Figure 12:
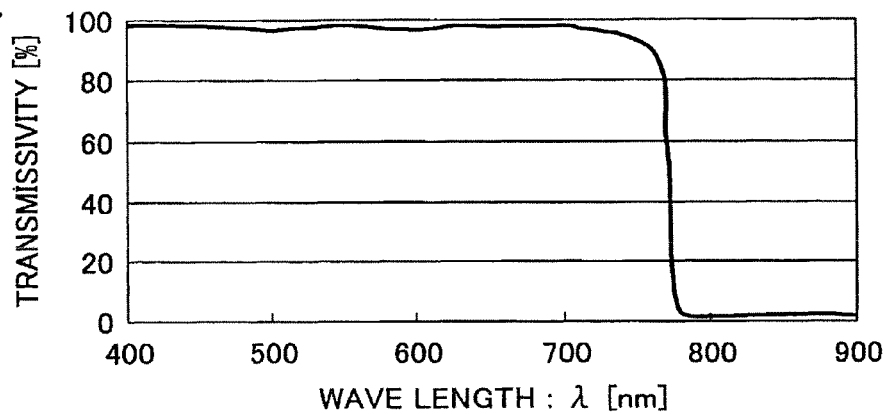
FIG. 12 shows a transmission characteristic of light beam according to another example of the first embodiment of the present invention.

And as to the other example of a first embodiment, a transmission and reflection switching means may be used instead of the numerical aperture limiting deflecting area for CD-system 107b, as shown in FIG. 11. Therefore, it may have a limiting numerical aperture coating area 107c evaporated a dichroic coating around the aberration correcting deflecting area for CD-system 107a to switch the light beam diameter by transmission and reflection as shown in FIG. 12. So, it becomes possible to transmit the light beam having a wavelength of 405 nm and 660 nm and reflect the light beam having a wavelength of 785 nm as shown in FIG. 11A, FIG. 11B and FIG. 11C. The wavelength selectable deflecting element 107 is slanted so that the reflected light beam having a wavelength of 785 nm is not incident on a photo detector.

Figure 13:
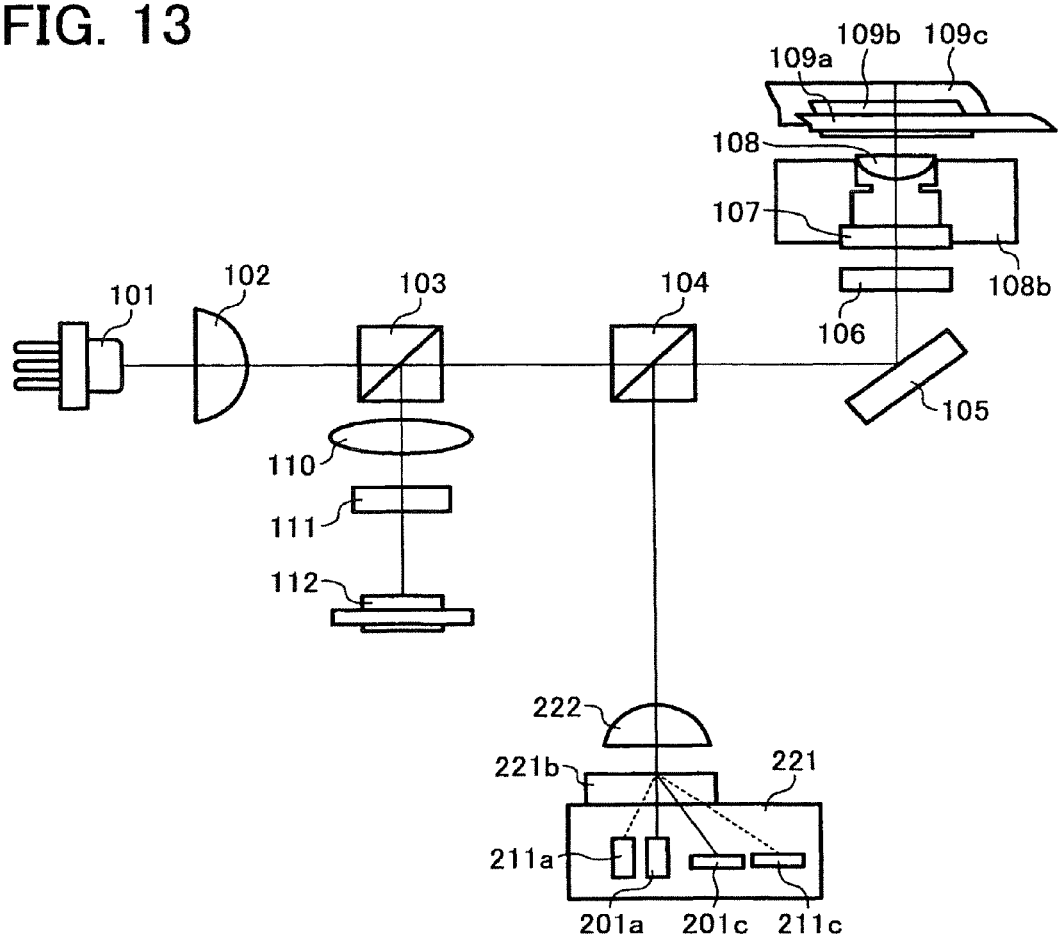
FIG. 13 shows a general configuration of an optical pickup according to another example of the first embodiment of the present invention.
Figure 14:
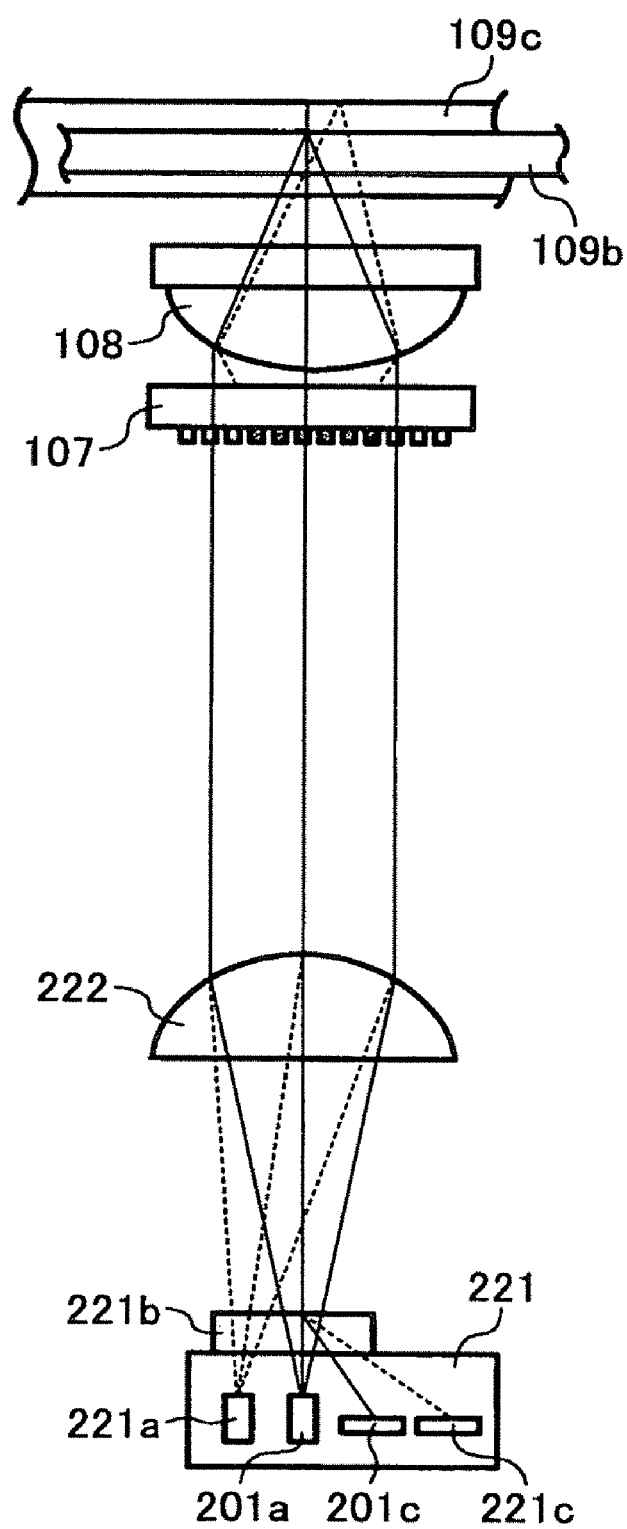
FIG. 14 shows a general configuration of a hologram unit for a DVD-system and CD-system light path of the optical pickup described in FIG. 13.
Figure 15:
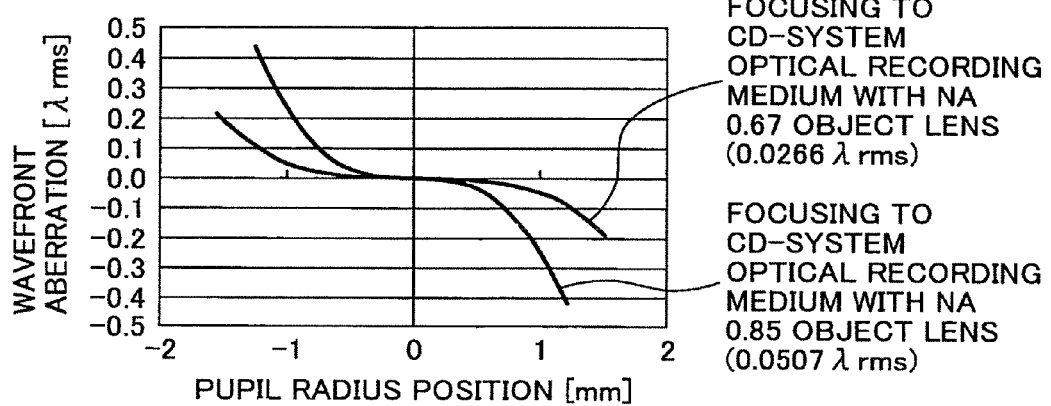
FIG. 15 shows a coma aberration for the optical pickup of FIG. 13.

FIG. 13 shows a general configuration of an optical pickup according to another example of the first embodiment of the present invention. There is a hologram unit 211 including a light source for a DVD-system and a light source for a CD-system in one package. In this case, it is possible to minimize the optical pickup. However, because it is necessary that the light sources for the DVD-system and the CD-system, in the hologram unit 211, be separated by at least several hundred μm, it is impossible to set the light sources on the same light axis, as shown in FIG. 14. Therefore, a coma aberration occurs as shown in FIG. 15. In this case, it is possible to obtain a good spot when a deflecting pattern to reduce the coma aberration is overlapped.

Figure 16:
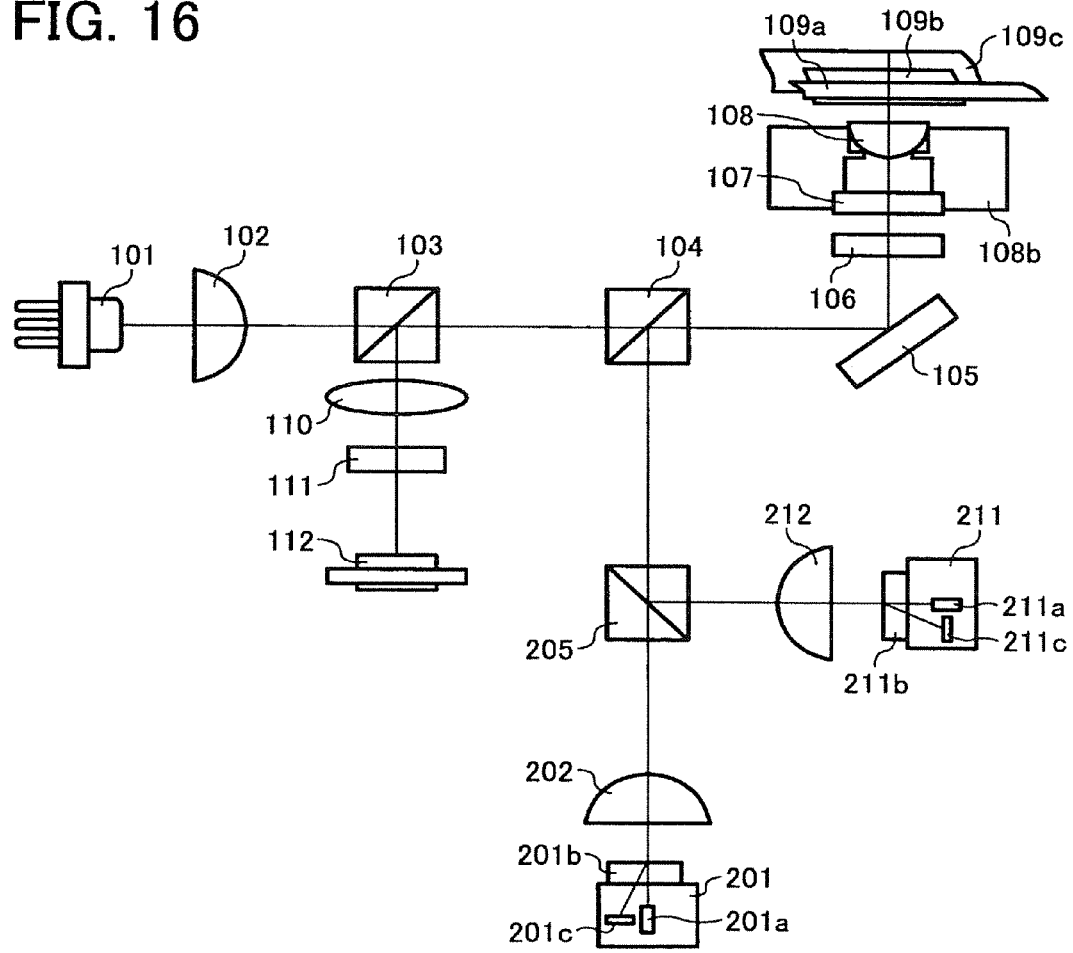
FIG. 16 shows a general configuration of an optical pickup according to a second embodiment of the present invention.

FIG. 16 shows a general configuration of an optical pickup according to a second embodiment of the present invention. By this optical pickup, information recording, reproduction or deletion is performed on each of a blue-system optical recording medium, with an operating wavelength of 405 nm, an NA of 0.67, and a light-incident side substrate thickness of 0.6 mm; a DVD-system optical recording medium, with an operating wavelength of 660 nm, an NA of 0.64, and a light-incident side substrate thickness of 0.6 mm; and a CD-system optical recording medium, with an operating wavelength of 785 nm, an NA of 0.50 and a light-incident side substrate thickness of 1.2 mm. The optical pickup has an infinite-system for the DVD-system. In this case, it is possible to increase the optical system layout freedom.

In the above-described optical pickup, a case where information recording, reproduction or deletion is performed on the blue-system optical recording medium, with the operating wavelength of 405 nm, an NA of 0.67, and a light-incident side substrate thickness of 0.6 mm, will now be described. A linearly polarized beam emitted from the semiconductor laser 101 with a wavelength of 405 nm is transformed into an approximately parallel beam by the collimator lens 102, and then, passes through the polarization beam splitter 103 and the trichroic prism 104. After that, the light path is deflected 90 degrees by the polarization prism 105, and the beam then passes through the wavelength plate 106, by which it is transformed into a circular polarization. And after that, the beam then passes through the wavelength selectable deflecting element 107, no effect is provided at all, and then it is incident on the object lens 108, by which it is focused into a minute spot on the optical recording medium 109a. Informational recording, reproduction, or deletion is performed by this spot on the optical recording medium.

After being reflected by the optical recording medium 109a, the light has a circular polarization in the direction opposite to that in the above-mentioned case of coming into the optical recording medium, is transformed into an approximately parallel beam again, is transformed into a linear polarization perpendicular to that in the above-mentioned case of coming into the optical recording medium by the wavelength plate 106, and is reflected by the polarization beam splitter 103, converged by the detection lens 110, and deflected in a splitting manner by the beam splitting device 111 into a plurality of beams, which are then incident on the light-receiving device 112. From the light-receiving device 112, an aberration signal, an information signal, and a servo signal are detected.

Next, a case will now be described where information recording, reproduction or deletion is performed on the DVD-system optical recording medium, with the operating wavelength of 660 nm, an NA of 0.65, and a light-incident side substrate thickness of 0.6 mm. The hologram unit 201 integrally includes a semiconductor laser 201a, hologram 201b, and light-receiving device 201c. The 660 nm light which comes out of the semiconductor laser 201a passes through the hologram 201b and thus, is transformed into an approximately parallel beam by the collimator lens 202. Then, the beam is transmitted through the dichroic prism 205 which transmits light in a red wavelength zone while it reflects light in an infrared wavelength zone, and is reflected by the trichroic prism 104 which transmits light in a blue wavelength zone while it reflects light in a red wavelength zone, in the direction toward the polarization prism 105. The light path is deflected 90 degrees by the polarization prism 105, and the wavelength plate 106 then transforms the beam into a circular or elliptic polarization. The beam is deflected for 1st order by the wavelength selectable deflecting element 107 to make a minute spot, and the beam then is incident on the object lens 108, by which the beam is focused into a minute spot on the optical recording medium 109b. Informational recording, reproduction, or deletion is performed by this spot on the optical recording medium.

After being reflected by the optical recording medium 109b, the beam is reflected by the polarization prism 105, reflected by the trichroic prism 104, converged by the collimator lens 202, and diffracted by the hologram 201b in the direction toward the light-receiving device 201c, which is in the same package as the semiconductor laser 201a. From the light-receiving device 201c, an aberration signal, an information signal, and a servo signal are detected.

A case will now be described where information recording, reproduction, or deletion is performed on the CD-system optical recording medium, with an operating wavelength of 785 nm, an NA of 0.50, and a light-incident side substrate thickness of 1.2 mm. As in the above-described case for a DVD system, a CD system pickup also has light receiving/emitting devices in one package or unit, and, a hologram unit which separates beams using a hologram is used generally. As such, the hologram unit 211 integrally includes a semiconductor laser 211a, a hologram 211b, and a light-receiving device 211c, as in the hologram unit 201. 785 nm light emitted by the semiconductor laser 211a passes through the hologram 211b, and is made into a parallel light beam by the collimator lens 212. After that, the light is reflected by the dichroic prism 205 which transmits light in the red wavelength zones while it reflects lights in the blue and infrared wavelength zones, and is reflected by the trichroic prism 104 which transmits light in the blue wavelength zone while it reflects lights in the red and infrared wavelength zones, in the direction toward the polarization prism 105. The light path is deflected 90 degrees by the polarization prism 105. The wavelength plate 106 transforms the light into an elliptic polarization or a circular polarization, and the light is controlled in its cross section to an NA of 0.50 by the wavelength selectable deflecting element 107. The beam is deflected for 1st order by the wavelength selectable deflecting element 107 to make a minute spot. After that, the light is incident on the object lens 108, and thereby, it is focused into a minute spot on the optical recording medium 109c. Informational recording, reproduction, or deletion is performed by this spot on the optical recording medium 109c.

After being reflected by the optical recording medium 109c, the light is deflected by the polarization prism 105, reflected by the trichroic prism 104, reflected by the dichroic prism 205, converged by the collimator lens 212, and diffracted by the hologram 211b in the direction toward the light-receiving device 211c, which is held in the same package or unit as the semiconductor laser 211a. From the light-receiving device 211c, an aberration signal, an information signal, and a servo signal are detected.

Next, a case will now be described where a wavelength selectable deflecting element is used for compatibility with the blue-system, operating wavelength of 660 nm and NA of 0.65, DVD-system and CD-system. Because the numerical aperture limiting deflecting area for the CD-system 107b in this embodiment is the same as the numerical aperture limiting deflecting area 107b in the first embodiment, a description of the deflecting area 107b is omitted. An aberration correcting deflecting area for DVD-system 107d, which is different from the detailed description of the first preferred embodiment, will now be described.

It was already described above that the aberration characteristic for the single object lens 108 is optimum at the wavelength of 405 nm and the substrate thickness of 0.6 mm. When light with a wavelength of 660 nm is incident on the lens 108, with an infinite system, a beam spot is formed on the DVD-system optical recording-medium 109b (substrate thickness of 0.6 mm) and the wavefront aberration is as shown in FIG. 2B.

Figure 17A:
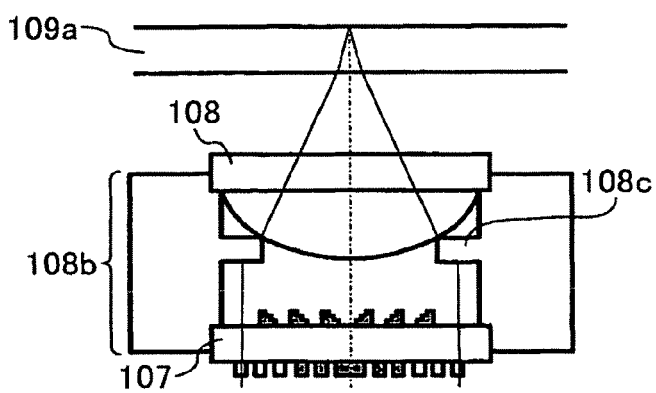
FIGS. 17A through 17C show transmission characteristics of light beam at the wavelength selectable deflecting element with the aberration correcting deflecting area for DVD-system according to a second embodiment of the present invention.
Figure 17B:
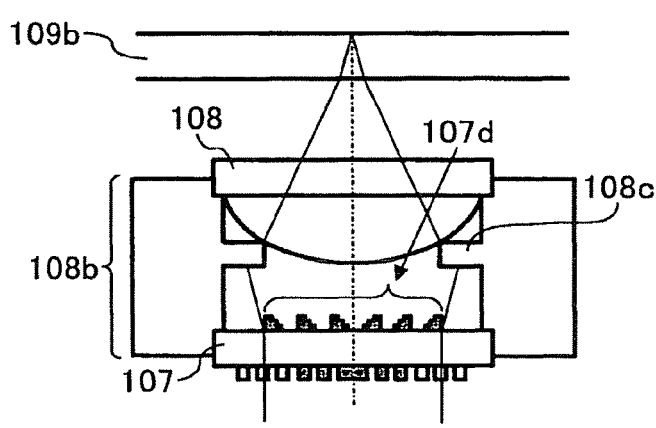
Figure 17C:
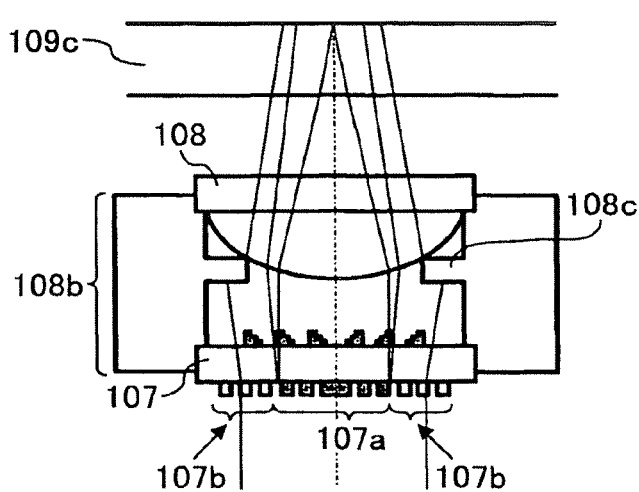

As an aberration correction area for DVD-system, it is preferable that a diffraction pattern is designed to transmit light in a blue wavelength zone and light in a red wavelength zone, no effect is provided at all, and deflect to correct the spherical aberration. It is known, as described in Japanese Laid-open Patent No. 2003-177226, to reduce such a spherical aberration by a deflecting area. Referring now to FIG. 17A, FIG. 17B and FIG. 17C, the aberration correcting deflecting area for DVD-system 107d has a 4 level stair-step shaped section for example. The aberration correcting deflecting area for DVD-system 107d emits a zero-order deflected light beam when light in a blue wavelength zone and light in a red wavelength zone is incoming. The aberration correcting deflecting area for DVD-system 107d emits a 1st-order deflected light beam when light in a blue wavelength zone and light in an infrared wavelength zone is incoming. Therefore, as above described, the aberration correcting deflecting area for DVD-system 107d transmits a light beam in a blue wavelength zone and also transmits a light beam in a red wavelength zone. But the aberration correcting deflecting area 107d deflects a light beam in an infrared wavelength zone. The deflecting ratio is designed to correct the spherical aberration in the object lens 108 for the light beam having a wavelength of 660 nm and the spherical aberration in the substrate of the DVD-system optical recording medium 109b for the light beam having a wavelength of 660 nm. As such, it becomes possible to focus the light beam having a wavelength of 660 nm onto the DVD-system optical recording medium 109b.

The aberration correcting deflecting area for DVD-system 107d does not have a rectangular shape but rather has a 4 level stair-step shaped section. In this case, a zero-order deflecting light transmissivity $\eta_0$, the +1st-order deflecting light deflection efficiency $\eta_{+1}$ and the −1st-order deflecting light deflection efficiency $\eta_{-1}$ are defined by the following formulas:

$$\eta_0 = \cos^2(\Phi/2)\cos^4(\Phi/4)$$

$$\eta_{+1} = (8/\pi^2)\sin^2(\Phi/2)\cos^2[(\Phi-\pi)/4]$$

$$\eta_{-1} = (8/\pi^2)\sin^2(\Phi/2)\cos^2[(\Phi+\pi)/4]$$

$$(\Phi = 2\pi(n-1)h/\lambda)$$

where h denotes the height of each stair-step; n denotes the refractive index; $\lambda$ denotes the wavelength of incident light.

Figure 18:
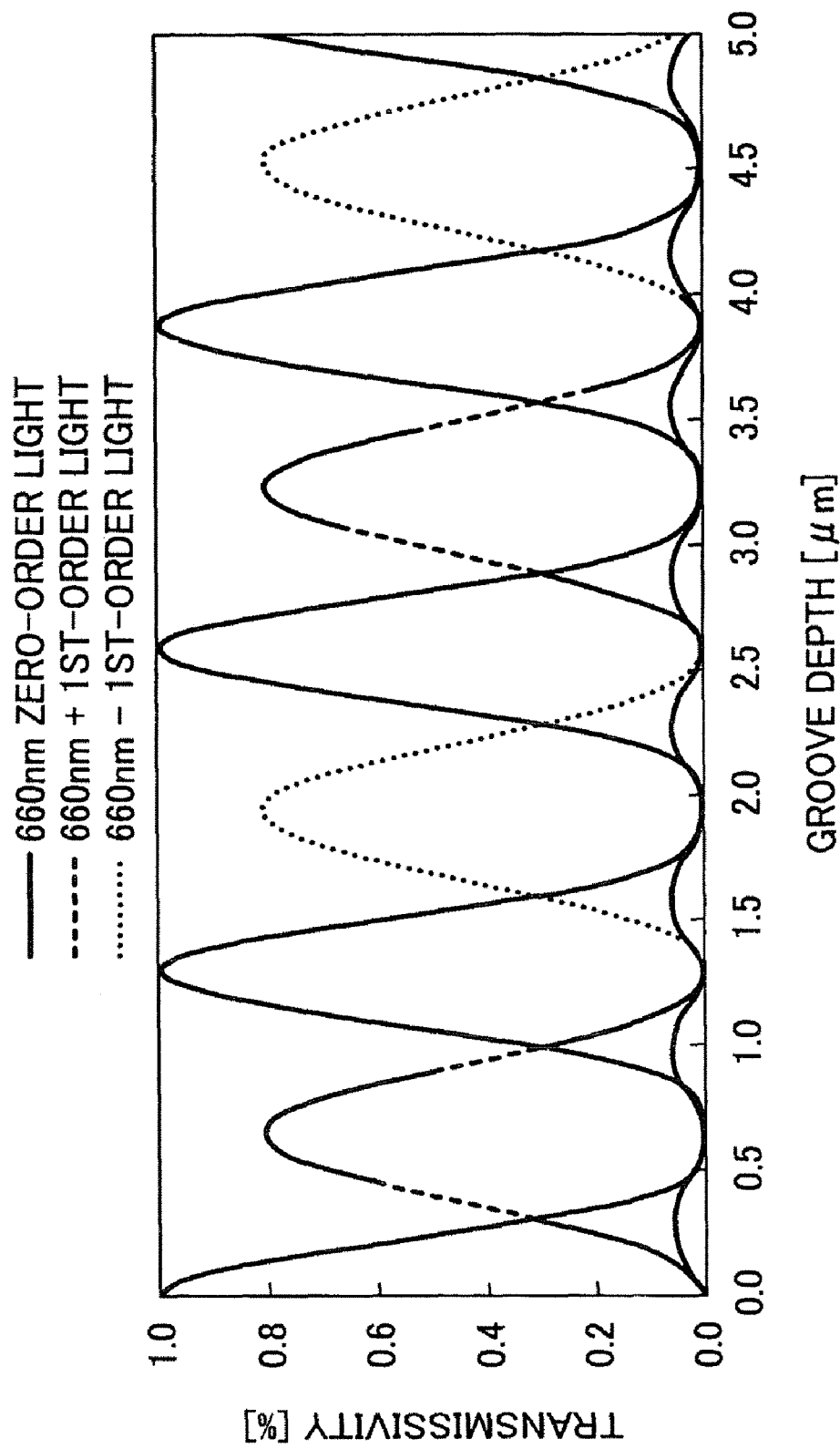
FIG. 18 shows the relationship between transmissivity and groove depth of the deflecting pattern for DVD-system according to a second embodiment of the present invention.

FIG. 18 shows the relationship between transmissivity and groove depth of the deflecting pattern for DVD-system. For example, under the conditions h of 1.53 μm, the height of 4 stair-steps of 4.58 μm, materials of BK7 (manufactured by HOYA), $\lambda$ of 405 nm and n of 1.530, because $\Phi$ is $12\pi$, the zero-order deflecting light transmissivity $\eta_0$ becomes 1, the +1st-order deflecting light deflection efficiency $\eta_{+1}$ becomes 0, and the −1st-order deflecting light deflection efficiency $\eta_{-1}$ becomes 0. And for example, under the conditions h of 1.53 μm, the height of 4 stair-steps of 4.58 μm, materials of BK7 (manufactured by HOYA), $\lambda$ of 660 nm and n of 1.514, because $\Phi$ is $7.13\pi$, the zero-order deflecting light transmissivity $\eta_0$ becomes 1, the +1st-order deflecting light deflection efficiency $\eta_{30\ 1}$ becomes 0.01, and the −1st-order deflecting light deflection efficiency $\eta_{-1}$ becomes 0.76. And also for example, under the conditions h of 1.53 μm, the height of 4 stair-steps of 4.58 μm, materials of BK7 (manufactured by HOYA), $\lambda$ of 785 nm and n of 1.5111, because $\Phi$ is $4\pi$, the zero-order deflecting light transmissivity $\eta_0$ becomes 1, the +1st-order deflecting light deflection efficiency $\eta_{+1}$ becomes 0, and the −1st-order deflecting light deflection efficiency $\eta_{-1}$ becomes 0. As above described, $\eta_0^2$ becomes 1 for $\lambda$ of 405 nm, $\eta_0^2$ becomes 1 for $\lambda$ of 660 nm, and $\eta_0^2$ becomes 0.58 for $\lambda$ of 785 nm.

Next, referring to FIG. 19, specific data is provided for the object lens according to the second embodiment of the present invention. As shown in FIG. 17, the aberration correcting deflecting area for CD-system 107a and the numerical aperture limiting deflecting area for CD-system 107b are located at the light source side of the wavelength selectable deflecting element 107, and the aberration correcting deflecting area for DVD-system 107d is located at the object lens side of the wavelength selectable deflecting element 107. In FIG. 19, "OBJ" represents the object point (laser diode used for optical source). Because the object lens 108 forms the infinite-system for wavelengths of 405 nm, 660 nm and 785 nm, "INFINITY" for the curvature radius RDY and the thickness THI means that the optical source is located at the infinite distance. Here, all the quantities having the dimension of length are represented by "mm."

Figure 20A:
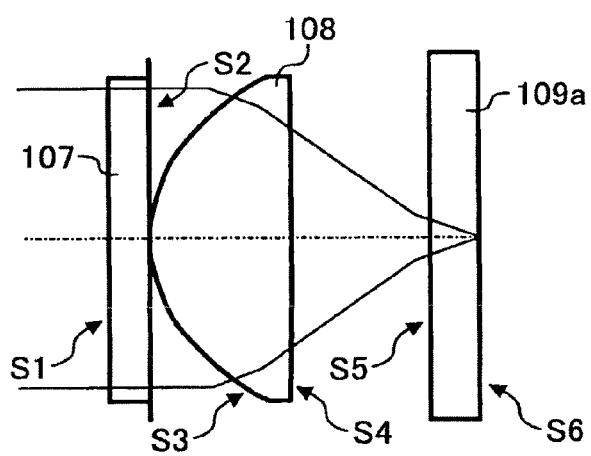
FIGS. 20A through 20C show a lens shape corresponding to the specific data of FIG. 19.
Figure 20B:
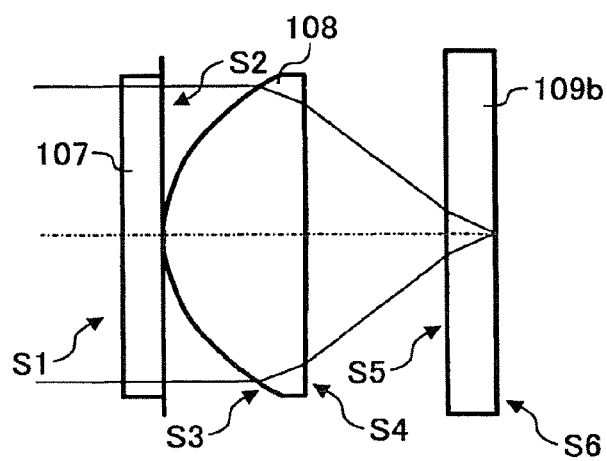
Figure 20C:
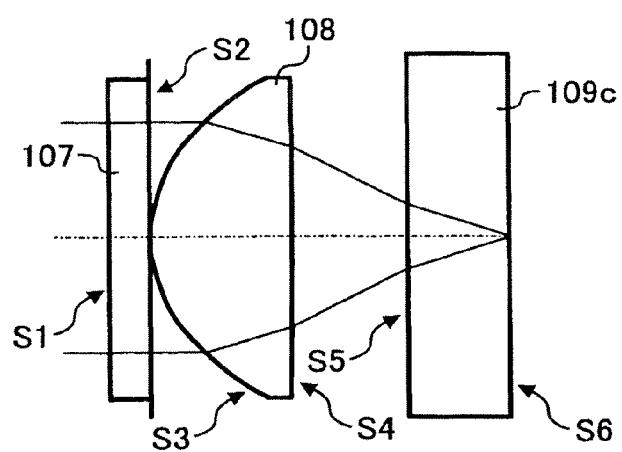

S1 represents a surface of the wavelength selectable deflecting element 107 at the side of the optical source, S2 represents a surface of the wavelength selectable deflecting element 107 at the side of the optical recording medium, S3 represents the lens surface of the object lens 108 at the side of the optical source, S4 represents the lens surface of the object lens 108 at the side of the optical recording medium. The objective lens 108 has a thickness of 1.70 mm, and the thickness value "1.64 mm" at the THI in the column for S4 represents the "working distance." Further, S5 represents the surface of the optical recording medium 109 irradiated by the optical beam and hence located at the side of the optical source, S6 represents an opposite side of the surface of the optical recording medium 109 irradiated with the optical beam and hence located at the side of the optical source. The distance between S5 and S6 (the substrate thickness) is 0.6 mm for the blue-system optical recording medium, 0.6 mm for the DVD-system optical recording medium, and 1.2 mm for the CD-system optical recording medium. EPD represents an incident pupil diameter. EPD is 4.0 mm for the blue-system, 4.0 mm for the DVD-system, and 3.1 mm for the CD-system. WL represents the wavelength. FIGS. 20A through 20C show a lens shape corresponding to the specific data of FIG. 19. FIG. 20A shows the blue-system optical recording medium, FIG. 20B shows the DVD-system optical recording medium, and FIG. 20C shows the CD-system optical recording medium.

The wavefront aberration in the above-described optical system is 0.0020 $\lambda$rms for the blue-system, 0.0020 $\lambda$rms for the DVD-system, and 0.0001 $\lambda$rms for the CD-system. They are under the Marecial's criterion of 0.07 $\lambda$rms.

In the above described case, the aberration correcting deflecting area for the CD-system 107a and the numerical aperture limiting deflecting area for the CD-system 107b are located at the light source side of the wavelength selectable deflecting element 107. The aberration correcting deflecting area for DVD-system 107d is located at the object lens side of the wavelength selectable deflecting element 107, but it may be located on the opposite side. And also in whole or in part of the aberration correcting deflecting area for CD-system 107a, the numerical aperture limiting deflecting area for CD-system 107b and the aberration correcting deflecting area for DVD-system 107d may be made on the object lens.

Figure 21A:
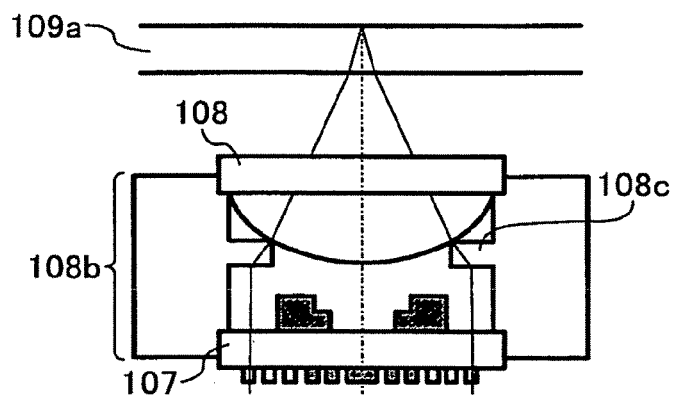
FIGS. 21A through 21C show transmission characteristics of a light beam at the wavelength selectable deflecting element with an aberration correcting phase shifter for a DVD-system according to a second embodiment of the present invention.
Figure 21B:
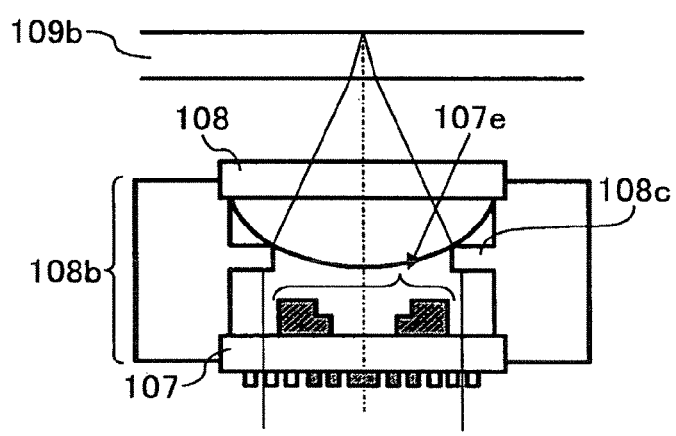
Figure 21C:
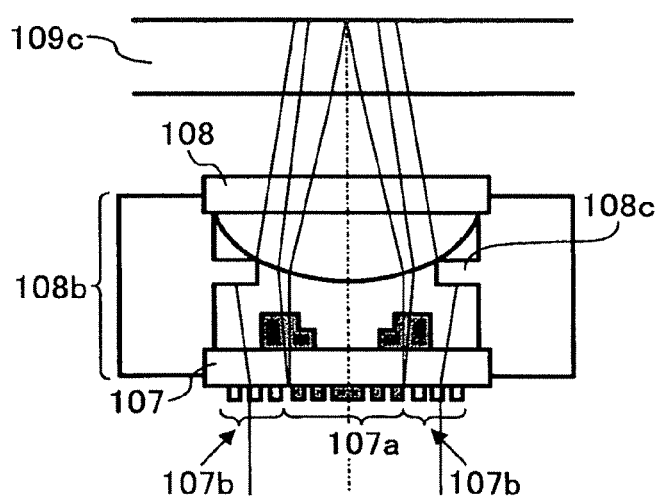

Next, another example of the second embodiment of the invention will be described. FIGS. 21A through 21C show transmission characteristics of a light beam at the wavelength selectable deflecting element with an aberration correcting phase shifter for DVD-system. FIG. 21A shows the transmission characteristics for the blue-system optical recording medium, FIG. 21B shows the transmission characteristics for the DVD-system optical recording medium, and FIG. 21C shows the transmission characteristics for the CD-system optical recording medium. It may be used instead of the above described aberration correction element, as shown in FIG. 21.

A shift pattern of an aberration correction phase shifter area for DVD-system 107e on the wavelength selectable deflecting element 107 provides no effect at the wavelength of 405 nm and the wavelength of 785 nm. But the shift pattern of the aberration correction phase shifter area for CD-system 107e on the wavelength selectable deflecting element 107 provides maximum effect for the wavelength of 660 nm.

It is possible to provide no effect in the wavelength of 405 nm and the wavelength of 785 nm by satisfying the following formula:

$$\delta(\lambda)=2\pi(n-1)h/\lambda$$

where h denotes the height of each stair-step; and λ denotes the wavelength of incident light.

In the above described case, it is preferable to choose the phase difference δ (405 nm) and δ (785 nm) to be 2π times an integral number. The phase difference δ is defined by the substrate materials. For example, under the conditions h of 1.34 μm and materials of BaCD5 (manufactured by HOYA), it may choose n of 1.604949 and δ (405 nm) of 4.0π for λ of 405 nm, n of 1.586051 and δ (660 nm) of 2.4π for λ of 660 nm, and n of 1.582509 and δ (785 nm) of 2.0π for λ of 785 nm.

Using such materials, the stair-step shaped section is designed to correct the spherical aberration in the object lens 108 for the light beam having a wavelength of 660 nm and the spherical aberration in the substrate of the DVD-system optical recording medium 109b for the light beam having wavelength of 660 nm.

Figure 22A:
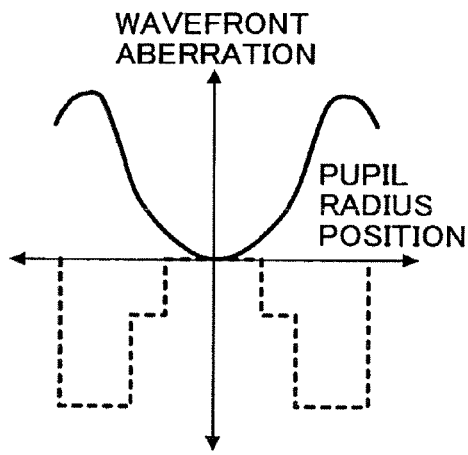
FIG. 22A shows a wavefront aberration (shown by a full line) and a wavefront aberration delayed by phase shift pattern (shown by a dashed line) according to a second embodiment of the present invention.
Figure 22B:
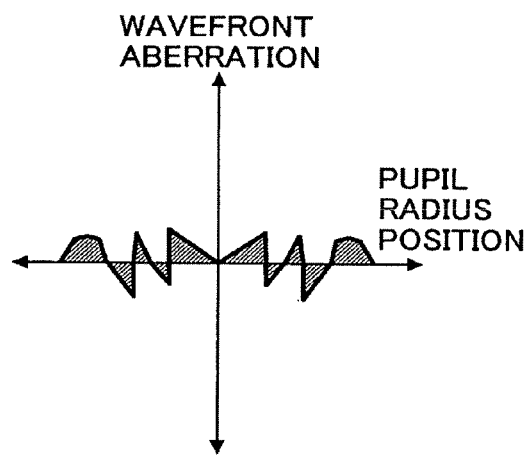
FIG. 22B shows a wavefront aberration after correction according to a second embodiment of the present invention.

Therefore, when the wavefront aberration has the shape shown in full line in FIG. 22A, because the stair-step shaped section is designed to give a phase difference shown by dashed line in FIG. 22A, it is possible to reduce the wavefront aberration. After this correction, the wavefront aberration is reduced as shown in FIG. 22B.

Figure 23:
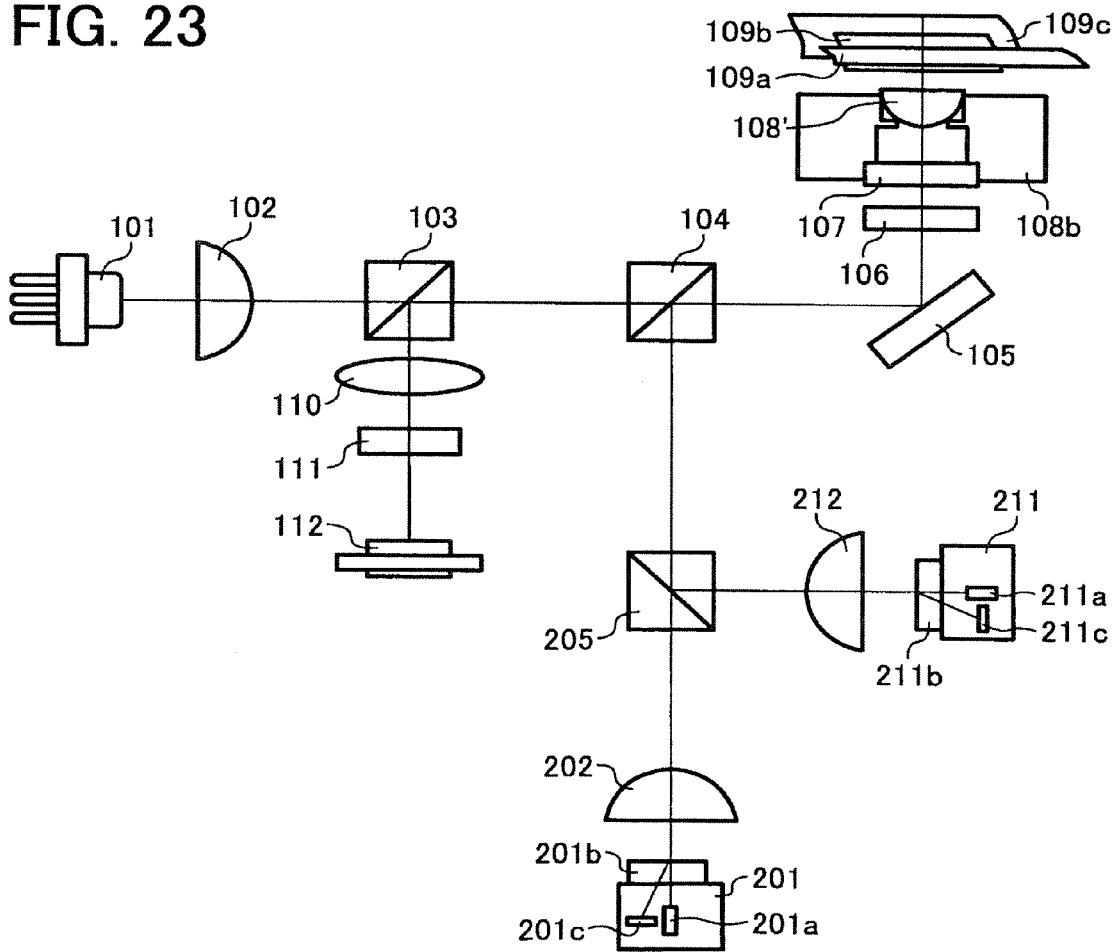
FIG. 23 shows a general configuration of an optical pickup according to a third embodiment of the present invention.
Figure 24A:
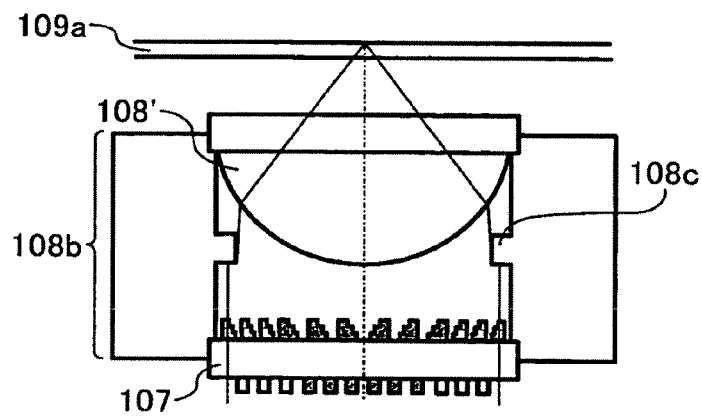
FIGS. 24A through 24C show transmission characteristics of a light beam at the wavelength selectable deflecting element with a limited numerical aperture deflecting area for a DVD-system at around the aberration correcting deflecting area for DVD-system according to a third embodiment of the present invention.
Figure 24B:
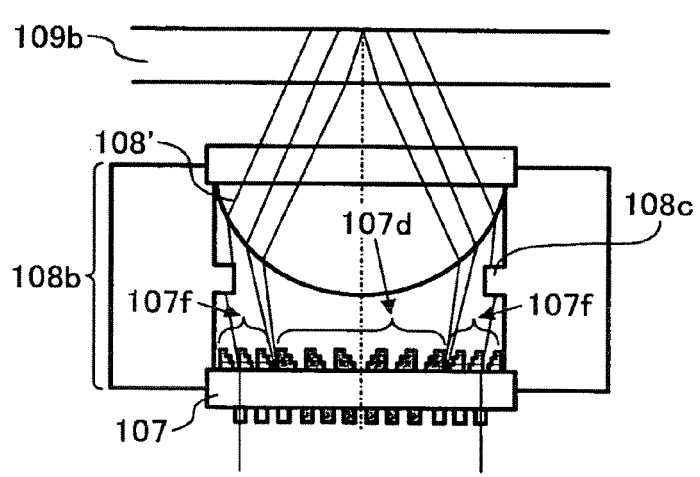
Figure 24C:
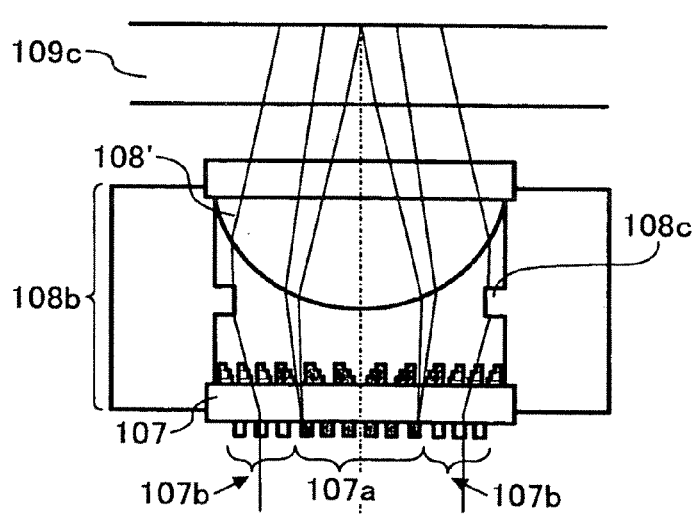

FIG. 23 shows a general configuration of an optical pickup according to a third embodiment of the present invention. By this optical pickup, information recording, reproduction or deletion is performed on each of a blue-system optical recording medium, with an operating wavelength of 405 nm, an NA of 0.85, and a light-incident side substrate thickness of 0.1 mm; a DVD-system optical recording medium, with an operating wavelength of 660 nm, an NA of 0.65, and a light-incident side substrate thickness of 0.6 mm; and a CD-system optical recording medium, with an operating wavelength of 785 nm, an NA of 0.50, and a light-incident side substrate thickness of 1.2 mm. The blue-system optical recording medium is different from the first and second embodiments. It has an operating wavelength of 405 nm, a NA of 0.85, and a light-incident side substrate thickness of 0.1 mm. In this case, it is possible to increase a capacity for data recording.

In the above-described optical pickup, a case where information recording, reproduction or deletion is performed on the blue-system optical recording medium, with the operating wavelength 405 nm, NA of 0.85, and a light-incident side substrate thickness of 0.1 mm, will now be described. A linearly polarized beam emitted by the semiconductor laser 101 with a wavelength of 405 nm is transformed into an approximately parallel beam by the collimator lens 102, and then, passes through the polarization beam splitter 103 and the trichroic prism 104. After that, the light path is deflected 90 degrees by the polarization prism 105, and the beam then passes through the wavelength plate 106, by which it is transformed into a circular polarization. And after that, the beam then passes through the wavelength selectable deflecting element 107, no effect is provided at all, and then it is incident on the object lens 108', by which it is focused into a minute spot on the optical recording medium 109a. Informational recording, reproduction, or deletion is performed by this spot on the optical recording medium.

After being reflected by the optical recording medium 109a, the light has a circular polarization in the direction opposite to that in the above-mentioned case of coming into the optical recording medium. The light is transformed into an approximately parallel beam again, transformed into a linear polarization, perpendicular to that in the above-mentioned case of coming into the optical recording medium, by the wavelength plate 106, and reflected by the polarization beam splitter 103. The beam is converged by the detection lens 110, deflected in a splitting manner by the beam splitting device 111 into a plurality of beams, which are then incident on the light-receiving device 112. From the light-receiving device 112, an aberration signal, an information signal, and a servo signal are detected.

Next, a case will now be described where information recording, reproduction or deletion is applied to the DVD-system optical recording medium, with an operating wavelength of 660 nm, an NA of 0.65, and a light-incident side substrate thickness of 0.6 mm. The hologram unit 201 integrally includes a semiconductor laser 201a, a hologram 201b, and a light-receiving device 201c. The 660 nm light which comes out of the semiconductor laser 201a passes through the hologram 201b and thus, is transformed into an approximately parallel beam by the collimator lens 202. Then, the beam is transmitted through the dichroic prism 205, which transmits light in a red wavelength zone while it reflects light in an infrared wavelength zone, and is reflected by the trichroic prism 104, which transmits light in a blue wavelength zone while it reflects light in a red wavelength zone, in the direction toward the polarization prism 105. The light is reflected 90 degrees by the polarization prism 105, and the wavelength plate 106 then transforms the beam into a circular or elliptic polarization. The beam is deflected for 1st order by the wavelength selectable deflecting element 107 to make a minute spot, and the beam then is incident on the object lens 108', by which the beam is focused into a minute spot on the optical recording medium 109b. Informational recording, reproduction, or deletion is performed by this spot on the optical recording medium.

After being reflected by the optical recording medium 109b, the beam is reflected by the polarization prism 105, reflected by the trichroic prism 104, converged by the collimator lens 202, and diffracted by the hologram 201b in the direction toward the light-receiving device 201c, which is held in the same package as the semiconductor laser 201a. From the light-receiving device 201c, an aberration signal, an information signal, and a servo signal are detected.

Then, a case will now be described where information recording, reproduction, or deletion is performed on the CD-system optical recording medium, with the operating wavelength of 785 nm, an NA of 0.50, and a light-incident side substrate thickness of 1.2 mm. As in the above-described case for a DVD system, a pickup of CD system also has light receiving/emitting devices all located in one package, and, a hologram unit which separates beams using a hologram is used generally. As such, the hologram unit 211 integrally includes a semiconductor laser 211a, a hologram 211b, and a light-receiving device 211c, as in the hologram unit 201. A 785 nm light which comes out of the semiconductor laser 211a of this hologram unit 211, passes through the hologram 211b, and is made into a parallel light beam by the collimator lens 212. After that, the light is reflected by the dichroic prism 205, which transmits light in the red wavelength zone while it reflects light in the blue and infrared wavelength zones, and is reflected by the trichroic prism 104, which transmits light in the blue wavelength zones but reflects light in the red and infrared wavelength zones, in the direction toward the polarization prism 105. The light path is deflected 90 degrees by the polarization prism 105. The wavelength plate 106 transforms the light into an elliptic polarization or a circular polarization, and the light is controlled in its cross section into an NA of 0.50 by the wavelength selectable deflecting element 107. The beam is deflected for 1st order by the wavelength selectable deflecting element 107 to make a minute spot. After that, the light is incident on the object lens 108', and thereby, it is focused into a minute spot on the optical recording medium 109c. Informational recording, reproduction, or deletion is performed by this spot on the optical recording medium 109c.

After being reflected by the optical recording medium 109c, the light is deflected by the polarization prism 105, reflected by the trichroic prism 104, reflected by the dichroic prism 205, converged by the collimator lens 212, and diffracted by the hologram 211b in the direction toward the light-receiving device 211c, which is held in the same package as the semiconductor laser 211a. From the light-receiving device 211c, an aberration signal, an information signal, and a servo signal are detected.

In the third embodiment of this invention, because the blue-system has the NA of 0.85, the DVD-system has the NA of 0.65 and the CD-system has the NA of 0.50, it is necessary to switch between three stages. The light beam is limited by the aperture 108c in the actuator 108b for blue-system, is limited by the numerical aperture limiting deflecting area for CD-system the same as in the first embodiment. The light beam is limited by a numerical aperture limiting deflecting area for DVD-system 107f allocated around the aberration correcting deflecting area for DVD-system 107d.

It is preferable to use the 4 leveled stair-step shaped section for deflecting groove the same as in the second embodiment, for example. The numerical aperture limiting deflecting area for DVD-system 107f transmits light in a blue wavelength zone and light in a red wavelength zone while it deflects light in an infrared wavelength zone. A light beam emitted from the light source and deflected by the numerical aperture limiting deflecting area for DVD-system 107f is scattered to avoid overlapping the focused light spot. The light beam reflected by the optical recording medium is deflected again by the wavelength selectable deflecting element 107. If the deflected light beam is incident on the photo detector, it becomes noise. So it is preferable to design the pattern of the deflecting groove to avoid overlapping with the photo detector.

Figure 25A:
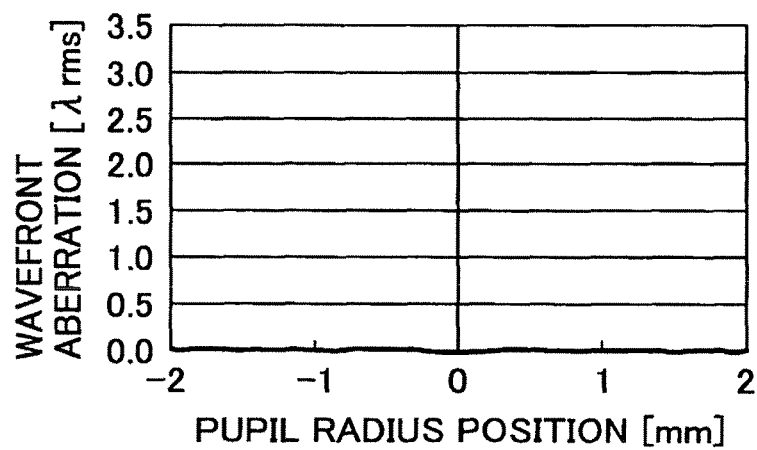
FIGS. 25A through 25C show wavefront aberrations focusing on an optical recording medium according to a third embodiment of the present invention.
Figure 25B:
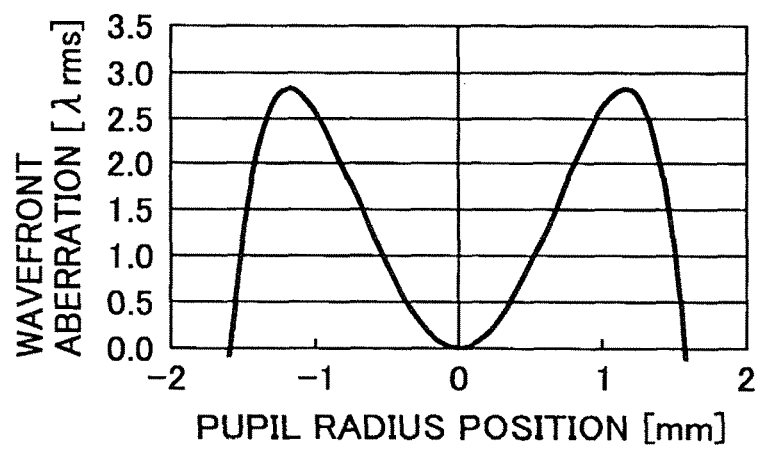
Figure 25C:
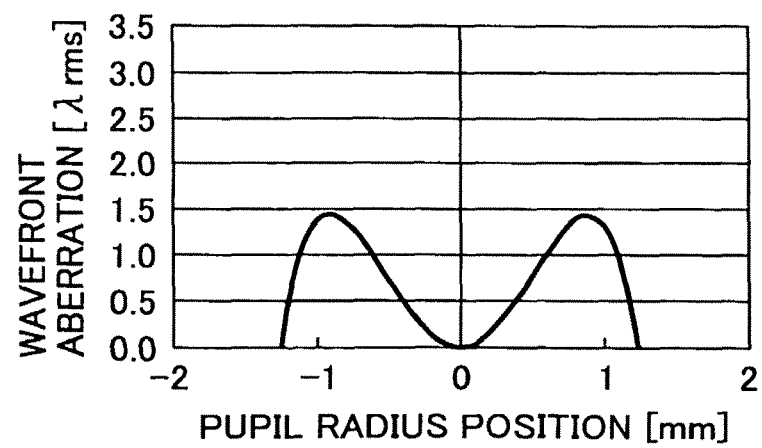

FIG. 25A shows when the optical recording medium is the blue-system one using a wavelength of 405 nm, an NA of 0.85, Φ of 4.0 mm, and an infinite system incident light beam. FIG. 25B shows when the optical recording medium is the DVD-system one using a wavelength of 660 nm, an NA of 0.65, Φ of 3.2 mm, and an infinite system incident light beam. FIG. 25C shows when the optical recording medium is the CD-system one using a wavelength of 785 nm, an NA of 0.50, Φ of 2.5 mm, and an infinite system incident light beam.

The aberration characteristic of the single object lens 108' is optimum at the wavelength of 405 nm and the substrate thickness of 0.1 mm, as shown in FIG. 25A. When infinite system light, with a wavelength of 660 nm, is incident on the lens 108', and the lens forms a beam spot on a DVD-system optical recording-medium 109b having a substrate thickness of 0.6 mm, then the wavefront aberration is as shown in FIG. 25B. The horizontal axis of FIG. 25B represents the pupil radius position and the vertical axis of FIG. 25B represents wavefront aberration. FIG. 25B shows the two dimensional cross-sectional shape of phase differential distribution, but actually, there is a three dimensional distribution and it has rotational symmetry around the vertical axis.

Figure 26A:
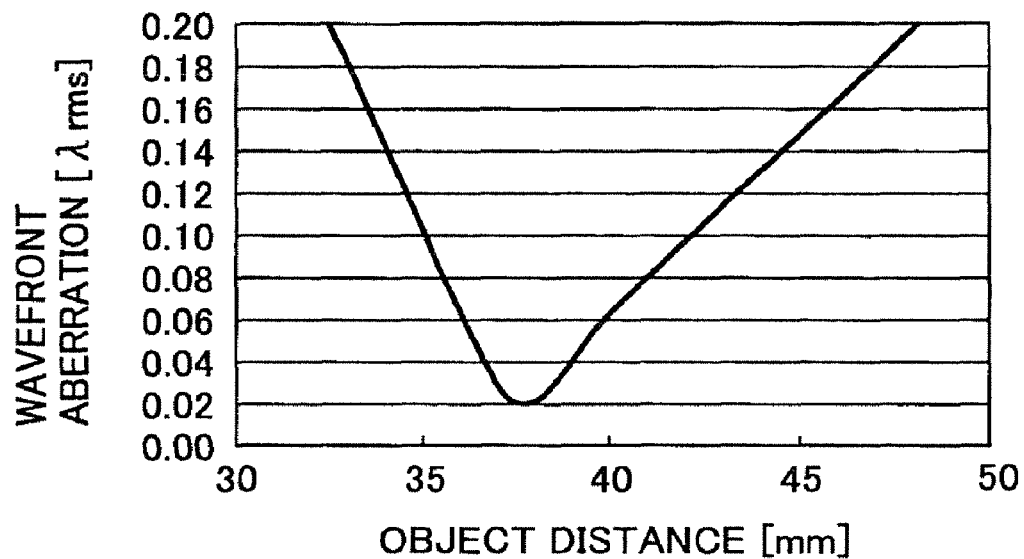
FIGS. 26A and 26B show the relationship between the object distance and the wavefront aberration according to a third embodiment of the present invention.
Figure 27A:
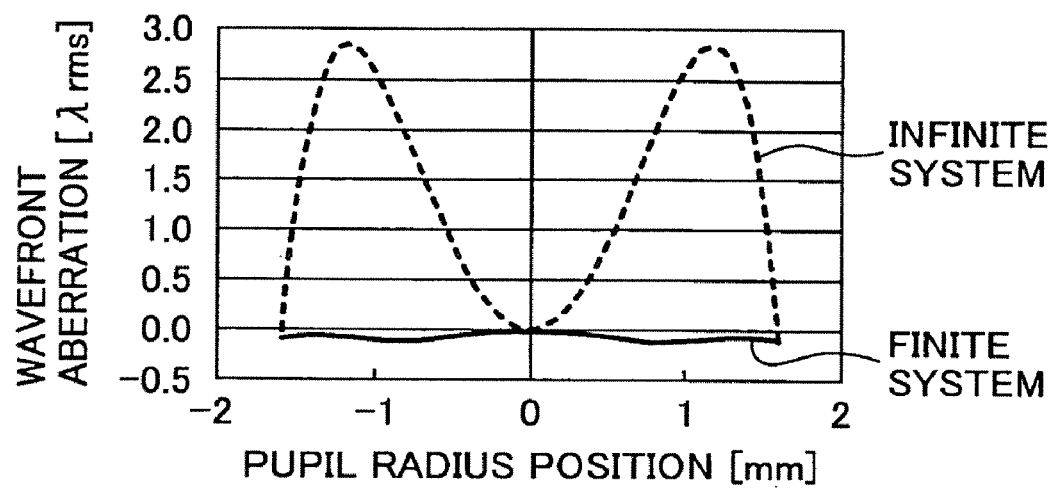
FIGS. 27A and 27B show wavefront aberrations according to a third embodiment of the present invention.
Figure 27B:
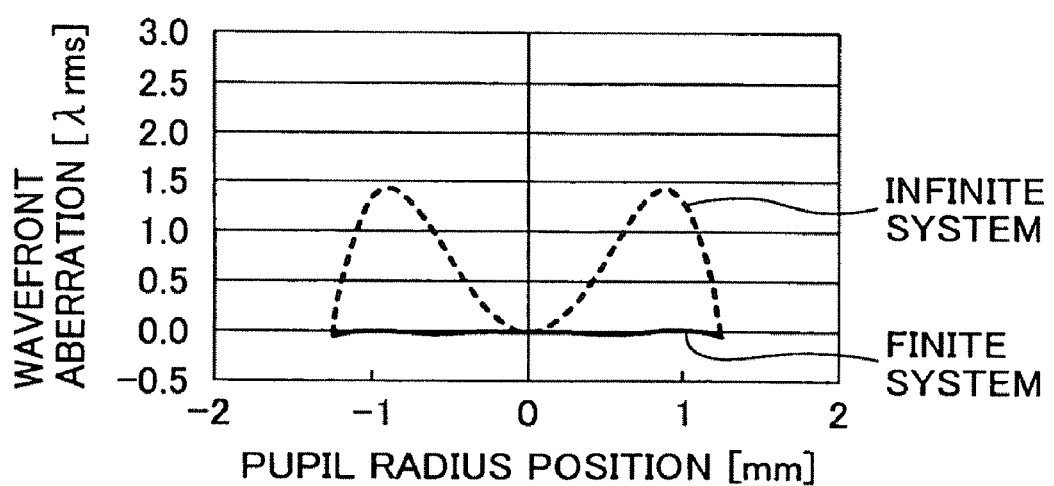

The DVD-system light path according to a third embodiment of the present invention has finite-system to correct the aberration. FIG. 26A shows the relationship between the object distance and the wavefront aberration when the light path is the DVD-system one using an object lens. The wavefront aberration is at a minimum around the object distance of 37 mm. FIG. 27A shows a wavefront aberration when the light path is the DVD-system one with finite system or infinite system using a wavelength of 660 nm, an NA of 0.64, Φ of 3.205 mm, and an object distance of 37.5 mm. Although no parts are shown between the object lens and the light source, there actually are a wavelength plate, a prism and a lens, etc. between the object lens and the light source. In particular, an optical pickup corresponding to 3 kinds of optical disc (blue-system, DVD-system and CD-system) has lots of parts, so the above described 37 mm of object distance is too short. It is a limitation for parts alignment.

Figure 26B:
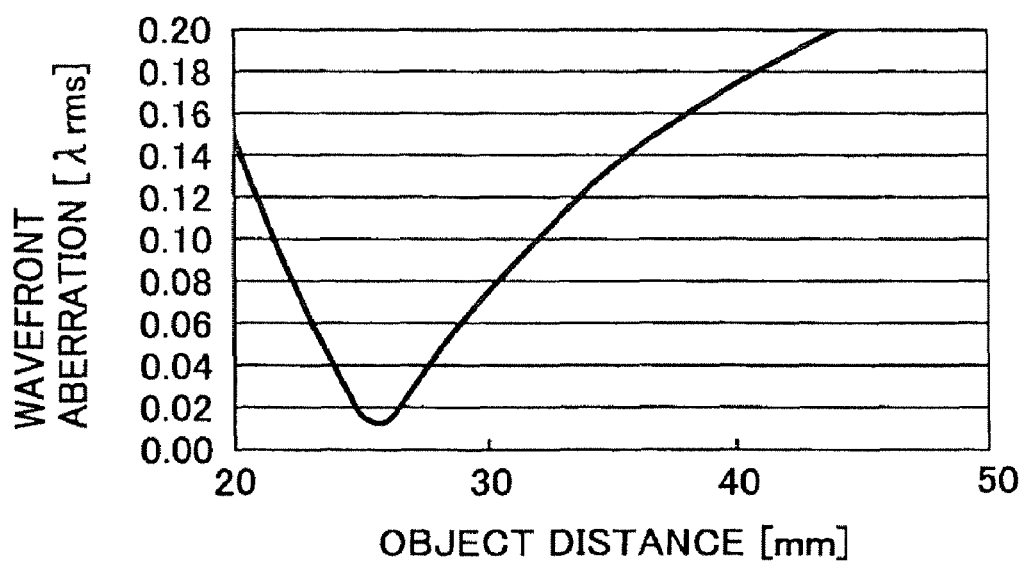

When infinite system light with a wavelength of 785 nm is incident on the lens 108', such that a beam spot is formed on the CD-system optical recording-medium 109c, having a substrate thickness of 1.2 mm, then the wavefront aberration is as shown in FIG. 25C. The horizontal axis of FIG. 25C represents a pupil radius position and the vertical axis of FIG. 25C represents a wavefront aberration. FIG. 26B shows the relationship between the object distance and the wavefront aberration when the light path is the CD-system one using an object lens which has an NA of 0.50. The wavefront aberration becomes minimum around the object distance of 26 mm. But the object distance that minimizes the wavefront aberration is shorter than the DVD-system one.

Figure 28A:
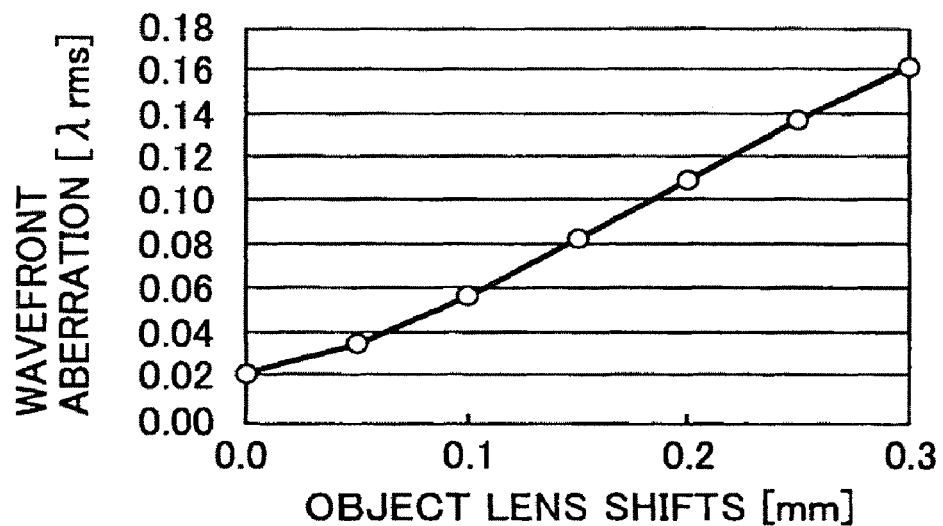
FIGS. 28A and 28B show the relationship between the object lens shifts and the wavefront aberration according to a third embodiment of the present invention.
Figure 28B:
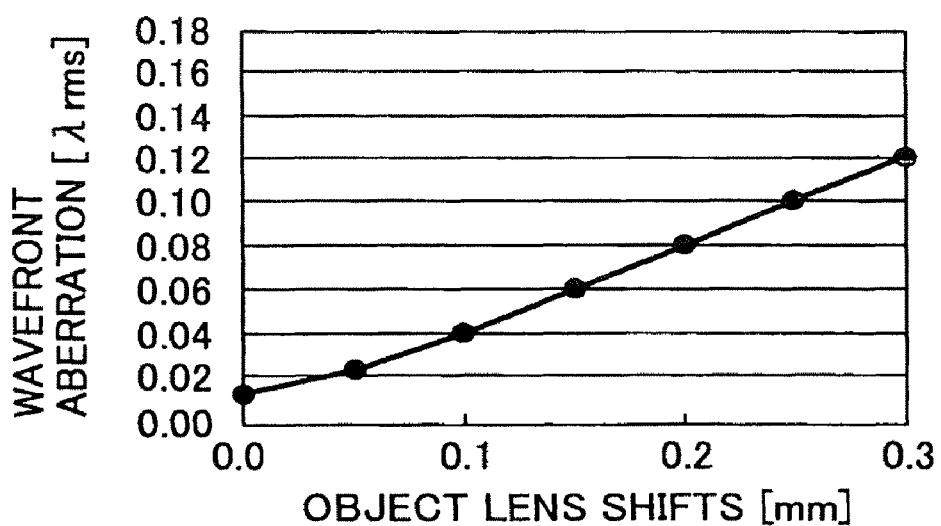

And above described, there is a problem from the effect about the object lens shifts. FIGS. 28A and 28B show relationships between the object lens shifts and the wavefront aberration. FIG. 28A shows when the light path is the DVD-system one with a finite system. FIG. 28B shows when the light path is the CD-system one with a finite system. It is preferable that the object lens shifts is 0.3 mm to 0.4 mm, but especially, the deterioration in CD-system is close to Marecial's criterion of 0.07 λrms, it is upper limitation of wavefront aberration generally. As above described, it is preferable to generate the incident light with an infinite-system in a DVD-system and a CD-system.

Specification data for an object lens according to a third embodiment of this invention is shown in the table of lens data of FIG. 29. In FIG. 29, "OBJ" represents the object point (laser diode used for optical source). "INFINITY" represents the curvature radius RDY and the thickness THI means that the optical source is located at the infinite distance. Here, all the quantities having the dimension of length are represented by "mm."

S1 represents a surface of the wavelength selectable deflecting element 107 at the side of the optical source, S2 represents a surface of the wavelength selectable deflecting element 107 at the side corresponding to the optical recording medium, S3 represents the lens surface of the object lens 108' at the side of the optical source, S4 represents the lens surface of the object lens 108' at the side corresponding to the optical recording medium. S5 represents the surface of the optical recording medium 109 irradiated with the optical beam and hence located at the side of the optical source, S6 represents an opposite side surface of the optical recording medium 109 and hence located at the side of the optical source. The distance between S5 and S6 is the substrate thickness, and is 0.1 mm for the blue-system optical recording medium, 0.6 mm for the DVD-system optical recording medium, and 1.2 mm for the CD-system optical recording medium. EPD represents an incident pupil diameter. WL represents the wavelength.

Figure 30A:
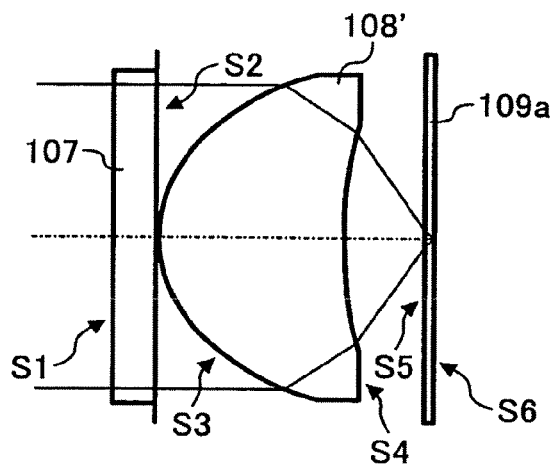
FIGS. 30A through 30C show a lens shape corresponding to the specific data shown in FIG. 29.
Figure 30B:
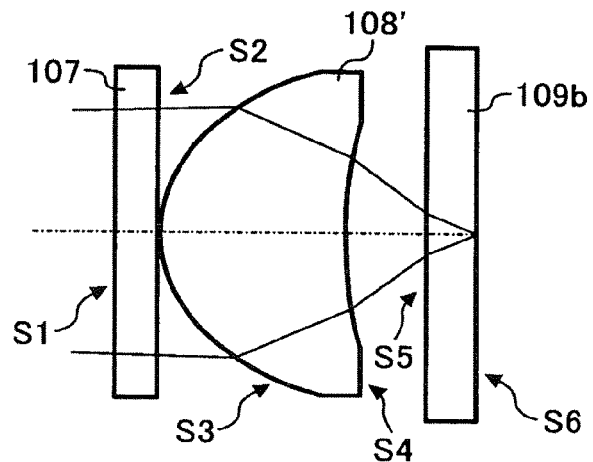
Figure 30C:
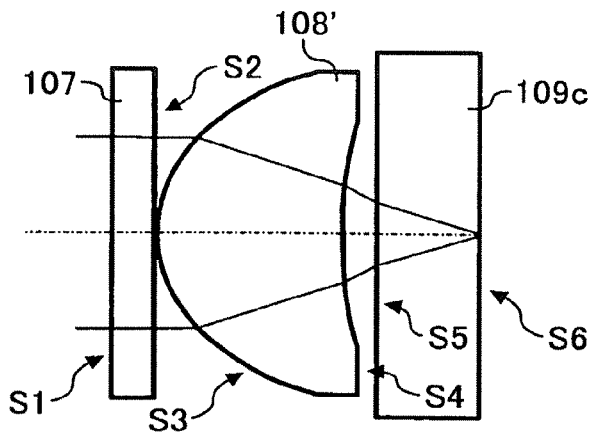
Figure 31A:
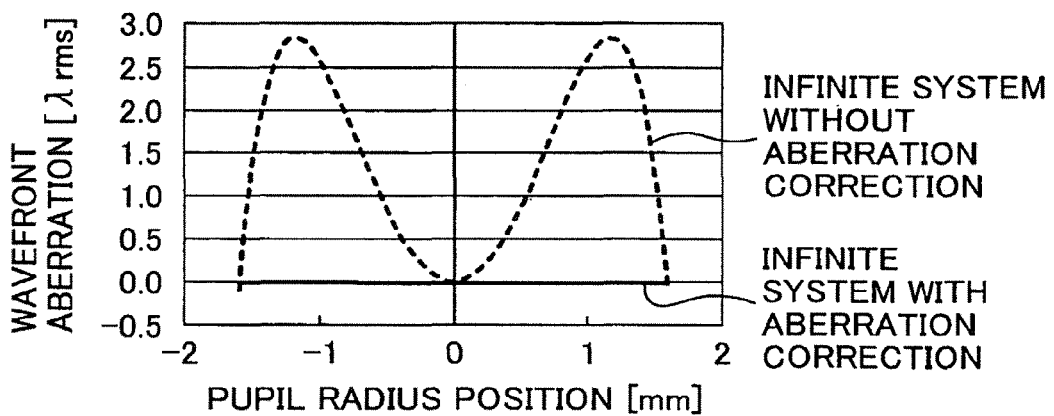
FIGS. 31A and 31B show wavefront aberrations according to a third embodiment of the present invention.
Figure 31B:
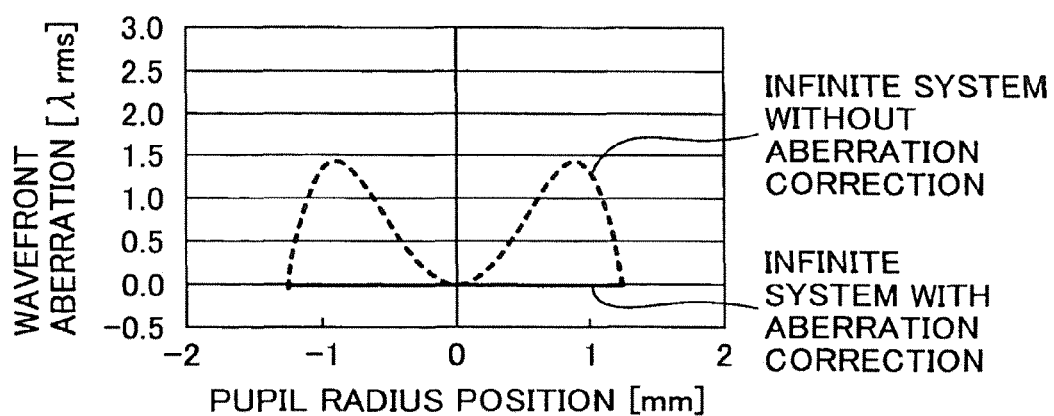

The wavefront aberration in the optical system using the above described object lens and wavelength selectable deflecting element is 0.0072 λrms for blue-system, 0.0014 λrms for DVD-system using 1st-order deflecting light beam, and 0.0001 λrms for CD-system using 1st-order deflecting light beam. They are under the Marecial's criterion of 0.07 λrms. FIGS. 30A through 30C show a lens shape corresponding to the specific data of FIG. 29. FIG. 30A is for the blue-system optical recording medium, FIG. 30B is for the DVD-system optical recording medium, and FIG. 30C is for the CD-system optical recording medium. In this case, the wavefront shape for the blue-system is the same as FIG. 25A, the wavefront shape for the DVD-system is the same as FIG. 31A, and the wavefront shape for the CD-system is the same as FIG. 31B.

Figure 32A:
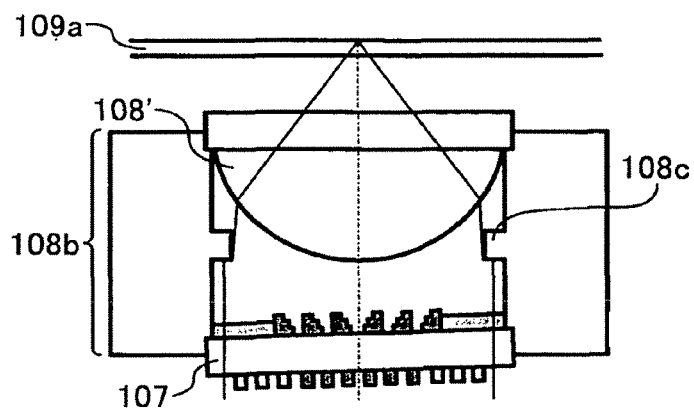
FIGS. 32A through 32C show transmission characteristics of light beam at the wavelength selectable deflecting element with a limited numerical aperture deflecting area for a DVD-system at around the aberration correcting deflecting area for a DVD-system according to another example of the third embodiment of the present invention.
Figure 32B:
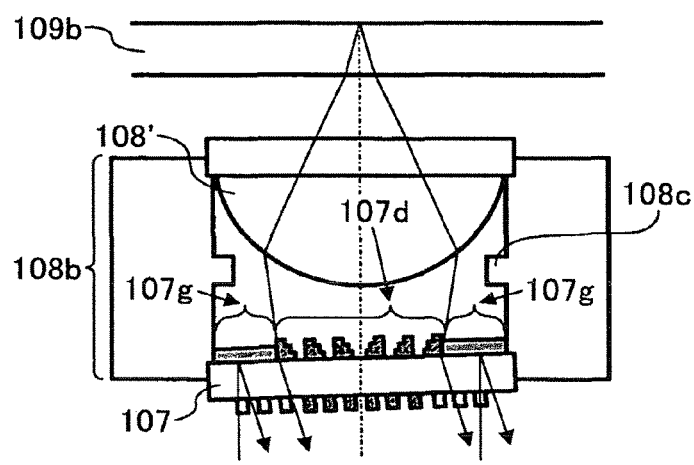
Figure 32C:
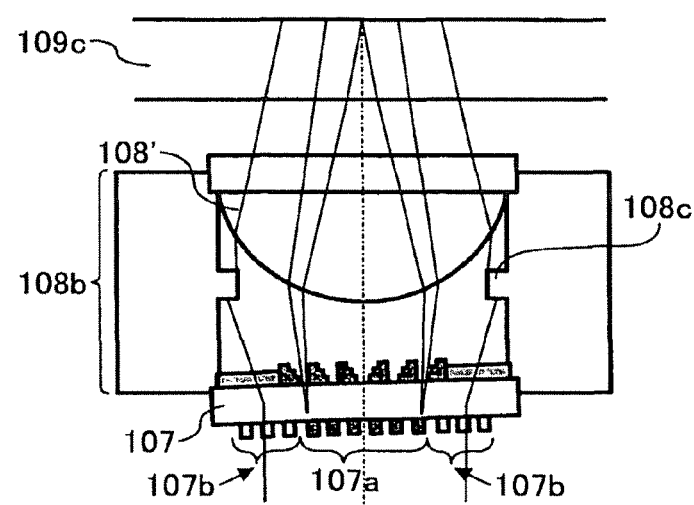
Figure 33:
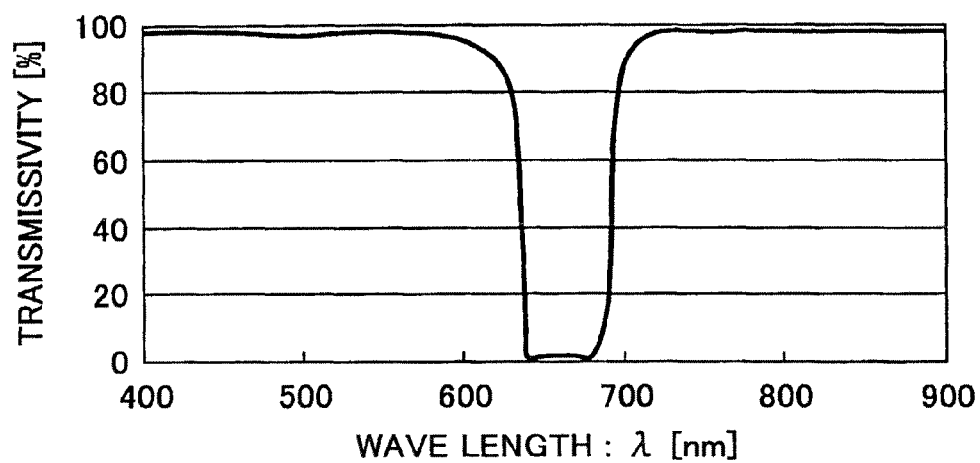
FIG. 33 shows a transmission ratio characteristic of dichroic coating for limiting the numerical aperture coating area for DVD-system according to the third embodiment of the present invention.

And as to the other example of a third embodiment, a transmission and reflection switching means may be used instead of the numerical aperture limiting deflecting area for DVD-system 107$f$ as shown in FIG. 32. Therefore, it may be used a limiting numerical aperture coating area 107$g$ evaporated a dichroic coating around the aberration correcting deflecting area for DVD-system 107$d$ to switch the light beam diameter by transmission and reflection as shown in FIG. 33. So, it becomes possible to transmit the light beam having a wavelength of 405 nm and 785 nm and reflect the light beam having a wavelength of 660 nm as shown in FIG. 32A, FIG. 32B and FIG. 32C. The wavelength selectable deflecting element 107 is slanted so that the reflected light beam having a wavelength of 660 nm is not incident on a photo detector.

Figure 34:
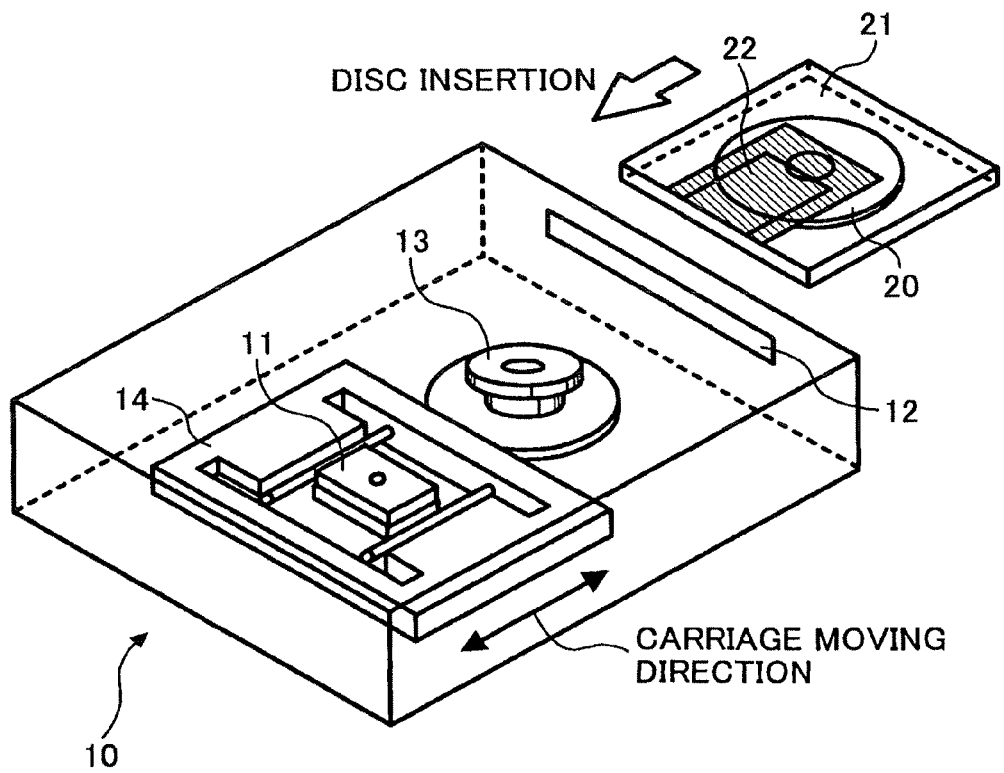
FIG. 34 shows a general configuration of an optical information processing apparatus according to a fourth embodiment of the present invention.

FIG. 34 is an internal perspective view showing a general configuration of an optical information recording apparatus according to the fourth embodiment of the present invention. The optical information recording apparatus 10, according to the fourth embodiment, also performs at least one of informational recording, reproduction, and deletion, with an optical pickup 11, on an optical recording medium 20. The optical recording medium 20 is disk-like, and is contained in a cartridge 21 as a protection case. Insertion of the optical recording medium 20 is carried out in the direction of an arrow indicated as "disc insertion," shown in the figure, through an insertion opening 12 in the optical information recording apparatus 10. The disc-like optical recording medium 20 is then rotated by a spindle motor 13, and informational recording, reproduction, or deletion is performed thereon by the optical pickup 11. The optical recording medium 20 may be used without the cartridge 21.

As this optical pickup 11, the optical pickup in each of the above-mentioned first through third embodiments of the present invention may be applied. The entire disclosure of Japanese Patent Application No. 2004-159641, filed May 28, 2004, is incorporated herein by reference.

The invention claimed is:

1. A wavelength selectable deflecting element for deflecting light having wavelengths $\lambda 1$, $\lambda 2$, and $\lambda 3$, said wavelengths $\lambda 1$, $\lambda 2$, and $\lambda 3$ respectively corresponding to optical recording mediums having substrate thicknesses t1, t2, and t3, wherein t1<t2<t3 and $\lambda 1 < \lambda 2 < \lambda 3$, said wavelength selectable deflecting element emitting a zero-order deflected light beam when light having the wavelength $\lambda 1$ is incident, and said wavelength selectable deflecting element emitting a 1st-order deflected light beam when light having the wavelength $\lambda 2$ or $\lambda 3$ is incident, wherein said wavelength selectable deflecting element emits a 1st-order deflected light beam that is scattered to avoid overlapping a focused light spot when light having one of the wavelengths $\lambda 2$ or $\lambda 3$ is incident.

2. The wavelength selectable deflecting element of claim 1, further comprising:

a first side having a first deflecting pattern for canceling spherical aberration in the respective optical information recording medium when light having the wavelength $\lambda 2$ is incident; and a second side having a second deflecting pattern for canceling spherical aberration in the respective optical information recording medium when light having the wavelength $\lambda 3$ is incident.

3. The wavelength selectable deflecting element of claim 1, wherein the wavelength selectable deflecting element has a coating area to transmit light having the wavelengths $\lambda 1$ and $\lambda 2$ and reflect light having the wavelength $\lambda 3$.

4. The wavelength selectable deflecting element of claim 1, wherein the wavelength selectable deflecting element has a coating area to transmit light having the wavelengths $\lambda 1$ and $\lambda 3$ and reflect light having the wavelength $\lambda 2$.

5. The wavelength selectable deflecting element of claim 1, wherein a deflecting pattern of the wavelength selectable deflecting element is designed to cancel coma aberration.

6. The wavelength selectable deflecting element of claim 1, wherein a shift pattern of at least one aberration correction phase shifter area for one of wavelengths $\lambda 2$ and $\lambda 3$ on the wavelength selectable deflecting element is designed to cancel spherical aberration.

7. An optical pickup which performs at least one of recording, reproduction and deletion of information on or from at least three optical recording media having respective substrate thicknesses of t1, t2, and t3, wherein t1<t2<t3, said pickup comprising:

a light source of a wavelength $\lambda 1$ for the optical recording medium which has the substrate thickness of t1, a light source of a wavelength $\lambda 2$ for the optical recording medium which has the substrate thickness of t2, and a light source of a wavelength $\lambda 3$ for the optical recording medium which has the substrate thickness of t3, wherein $\lambda 1 < \lambda 2 < 80\ 3$;

an object lens which condenses light from the light sources; and a wavelength selectable deflecting element which emits a zero-order deflected light beam when light having the wavelength $\lambda 1$ is incident, and which emits a 1st-order deflected light beam when light having the wavelength $\lambda 2$ or $\lambda 3$ is incident, wherein said wavelength selectable deflecting element emits a 1st-order deflected light beam that is scattered to avoid overlapping a focused light spot when light having one of the wavelengths $\lambda 2$ or $\lambda 3$ is incident.

8. The optical pickup of claim 7, wherein the wavelength selectable deflecting element comprises:

a first side having a first deflecting pattern for canceling spherical aberration in the respective optical information recording medium when light having the wavelength $\lambda 2$ is incident; and a second side having a second deflecting pattern for canceling spherical aberration in the respective optical information recording medium when light having the wavelength $\lambda 3$ is incident.

9. The optical pickup of claim 7, wherein light from the light source of the wavelength $\lambda 3$ is incident on the wavelength selectable deflecting element with an infinite system.

10. The optical pickup of claim 7, wherein the wavelength selectable deflecting element has a coating area to transmit light having the wavelengths $\lambda 1$ and $\lambda 2$ and reflect light having the wavelength $\lambda 3$.

11. The optical pickup of claim 7, wherein the wavelength selectable deflecting element has a coating area to transmit light having the wavelengths λ1 and λ3 and reflect light having the wavelength λ2.

12. An optical information processing apparatus comprising the optical pickup of claim 7, said apparatus performing at least one of recording, reproduction and deletion of information using at least one light beam having the wavelength of λ1, λ2 or λ3.

* * * * *